(12) United States Patent
Gilbert et al.

(10) Patent No.: US 11,137,873 B1
(45) Date of Patent: *Oct. 5, 2021

(54) FLIGHT DECK DISPLAY MANAGEMENT

(71) Applicant: The Boeing Company, Chicago, IL (US)

(72) Inventors: Brian David Gilbert, Kenmore, WA (US); John Wiedemann, Bothell, WA (US); Sherwin S. Chen, Bellevue, WA (US); Alireza Majd, Seattle, WA (US)

(73) Assignee: The Boeing Company, Chicago, IL (US)

( * ) Notice: Subject to any disclaimer, the term of this patent is extended or adjusted under 35 U.S.C. 154(b) by 4 days.

This patent is subject to a terminal disclaimer.

(21) Appl. No.: 17/007,788

(22) Filed: Aug. 31, 2020

Related U.S. Application Data

(63) Continuation of application No. 16/140,885, filed on Sep. 25, 2018, now Pat. No. 10,761,676.

(51) Int. Cl.
*G06F 3/0481* (2013.01)
*G06F 3/0484* (2013.01)
*B64D 43/00* (2006.01)
*G06F 3/0488* (2013.01)
*G06F 3/14* (2006.01)

(52) U.S. Cl.
CPC ........... *G06F 3/0481* (2013.01); *B64D 43/00* (2013.01); *G06F 3/0484* (2013.01); *G06F 3/0488* (2013.01); *G06F 3/1446* (2013.01)

(58) Field of Classification Search
CPC .................................................... G06F 3/0488
See application file for complete search history.

(56) References Cited

U.S. PATENT DOCUMENTS

| | | | | |
|---|---|---|---|---|
| 7,321,318 B2* | 1/2008 | Crane et al. | ........... | G01C 21/00 |
| 9,703,476 B1* | 7/2017 | Pappas et al. | ...... | G06F 3/04886 |
| 2004/0210847 A1* | 10/2004 | Berson et al. | ........... | G09G 5/00 |
| 2006/0184253 A1* | 8/2006 | Andrew et al. | ........ | G05B 11/01 |
| 2008/0282201 A1 | 11/2008 | Cabaret et al. | | |
| 2016/0347176 A1* | 12/2016 | Kawalker | .............. | B60K 35/00 |

OTHER PUBLICATIONS

Notice of Allowance dated Apr. 30, 2020, regarding U.S. Appl. No. 16/140,885, 13 pages.

* cited by examiner

*Primary Examiner* — James J Debrow
(74) *Attorney, Agent, or Firm* — Yee & Associates, P.C.

(57) ABSTRACT

A method and apparatus for displaying information for an aircraft on display devices in a flight deck of the aircraft. A computer system in the aircraft identifies information used to operate the aircraft. The computer system selects a display configuration from a plurality of display configurations for the display devices. The computer system displays the information in windows on display devices in the flight deck of the aircraft in the display configuration. The display configuration simplifies access to the information used to operate the aircraft.

18 Claims, 23 Drawing Sheets

| | NUMBER OF DISPLAY DEVICES OPERABLE | LOCATION | MULTIFUNCTION DISPLAY SIZE | MULTIFUNCTION DISPLAY REVERSION COLUMN | LEFT WINDOW CONFIGURATION | CENTER WINDOW CONFIGURATION | RIGHT WINDOW CONFIGURATION |
|---|---|---|---|---|---|---|---|
| 502 → | 3 | LEFT | HALF | N/A | PILOT 1 | CENTER 4 | COPILOT 1 |
| 504 → | 3 | LEFT | FULL | N/A | PILOT 1 | CENTER 2 | COPILOT 1 |
| 506 → | 3 | RIGHT | HALF | N/A | PILOT 1 | CENTER 5 | COPILOT 1 |
| 508 → | 3 | RIGHT | FULL | N/A | PILOT 1 | CENTER 3 | COPILOT 1 |
| 510 → | 3 | CENTER | HALF | N/A | PILOT 1 | CENTER 1 | COPILOT 1 |
| 512 → | 2 | LEFT | N/A | YES | PILOT 4 | N/A | COPILOT 3 |
| 514 → | 2 | LEFT | N/A | NO | PILOT 2 | N/A | COPILOT 3 |
| 516 → | 2 | RIGHT | N/A | YES | PILOT 3 | N/A | COPILOT 4 |
| 518 → | 2 | RIGHT | N/A | NO | PILOT 3 | N/A | COPILOT 2 |
| 520 → | 1 | LEFT | N/A | NO | N/A | CENTER 4 | N/A |
| 522 → | 1 | LEFT | N/A | YES | N/A | CENTER 6 | N/A |
| 524 → | 1 | RIGHT | N/A | NO | N/A | CENTER 5 | N/A |
| 526 → | 1 | RIGHT | N/A | YES | N/A | CENTER 7 | N/A |

FLIGHT DECK DISPLAY MANAGEMENT

This application is a continuation of U.S. patent application Ser. No. 16/140,885, filed Sep. 25, 2018, now U.S. Pat. No. 10,761,676.

CROSS-REFERENCE TO RELATED APPLICATIONS

This application was related to U.S. patent application Ser. No. 16/049,112, filed Jul. 30, 2018, entitled "Graphical User Interface in a Computer System in an Aircraft"; and U.S. U.S. patent application Ser. No. 16/049,183, filed Jul. 30, 2018, entitled "Graphical User Interface in a Computer System in an Aircraft", of which both were abandoned pre-publication.

BACKGROUND INFORMATION

1. Field

The present disclosure relates generally to aircraft and, in particular, to controlling an operation of an aircraft using windows displayed on display devices in a display system in a flight deck of the aircraft.

2. Background

Commercial aircraft, such as jet airplanes, are complex, large-capacity aircraft used to transport people, cargo, or some combination thereof. A flight deck of a jet airplane has a myriad of display devices and physical controls used to operate the aircraft. These display devices and physical controls are used to control the operation of aircraft systems such as an engine, a fuel system, hydraulics, a navigation system, a radio, and other systems in the aircraft.

Currently, the different display devices in the flight deck of the aircraft include a primary flight display device, a navigation display device, and an engine-indicating and crew-alerting system (EICAS) display device. These and other display devices in the flight deck of the aircraft provide information to a flight crew to operate the aircraft.

Large amounts of information are displayed on these display devices. For example, the primary flight display device can display information such as airspeed, altitude, attitude, rate of climb, autopilot modes, heading, and other information. As another example, the navigation display device can display information such as current course, next waypoint, position, and other information. The engine-indicating and crew-alerting system display can display engine parameters such as revolutions per minute, temperature, fuel flow, fuel quantity, wheel pressure, and other suitable types of information.

These and other display devices require the flight crew to know which display devices to view for the information needed to operate the aircraft. Additionally, once the needed information is located, the flight crew also needs to be able to quickly locate and manipulate physical controls such as switches, levers, or dials to make desired adjustments or changes.

The number of display devices and physical controls can increase the amount of time needed to perform tasks for a flight of the aircraft. Further, these display devices and physical controls can also increase the amount of mental concentration needed to properly perform tasks to operate the aircraft.

Additionally, the composition and arrangement of the display devices and physical controls can vary from one aircraft to another aircraft. This variation can limit the types of aircraft that pilots or other flight crew can operate without additional training.

Therefore, it would be desirable to have a method and apparatus that take into account at least some of the issues discussed above, as well as other possible issues. For example, it would be desirable to have a method and apparatus that overcome a technical problem with a number of display devices and physical controls in a flight deck of an aircraft.

SUMMARY

An embodiment of the present disclosure provides an aircraft control system comprising a computer system, display devices, and an information controller. The computer system is located in an aircraft. The display devices are for the computer system and are located in a flight deck of the aircraft. The information controller is in the computer system. The information controller is configured to display the information in windows on the display devices in the computer system in a display configuration that is selected based on a first set of tasks assigned to a pilot for a current flight of the aircraft and a second set of tasks assigned to a copilot for the current flight of the aircraft. The display configuration is selected from a plurality of display configurations for the display devices and wherein the display configuration simplifies access to the information used by the pilot to perform the first set of tasks and the copilot to perform the second set of tasks.

Another embodiment of the present disclosure provides a method of displaying information for an aircraft on display devices in a flight deck of the aircraft. A computer system in the aircraft identifies information used to operate the aircraft. The computer system selects a display configuration from a plurality of display configurations for the display devices based on a first set of tasks assigned to a pilot for a current flight and a second set of tasks assigned to a copilot for the current flight of the aircraft. The computer system displays the information in windows on display devices in the flight deck of the aircraft in the display configuration. The display configuration simplifies access to the information used by the pilot to perform the first set of tasks and the copilot to perform the second set of tasks.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 5 is an illustration of a table of display configurations in accordance with an illustrative embodiment;

FIG. 11 is an illustration of a center 4 window configuration in accordance with an illustrative embodiment;

DETAILED DESCRIPTION

The illustrative embodiments recognize and take into account one or more different considerations. For example, the illustrative embodiments recognize and take into account that windows can be located in one or more display devices and that these windows can be moved around into different configurations by a flight crew.

The illustrative embodiments recognize and take into account that these permutations on window configurations can include nonintuitive permutations. The illustrative embodiments recognize and take into account that an ability to rearrange windows into new configurations increases cognitive workload and can require increased training. The illustrative embodiments also recognize and take into account that having fixed configurations of windows on display devices can reduce flexibility and reconfiguration capabilities in a flight deck.

Thus, the illustrative embodiments provide a method, apparatus, and system for displaying information for an aircraft on display devices in the flight deck of the aircraft. In one illustrative example, a computer system in the aircraft identifies the information used to operate the aircraft. The computer system selects a display configuration from a plurality of display configurations for the display devices based on a first set of tasks assigned to a pilot for the current flight and a second set of tasks assigned to a copilot for the current flight of the aircraft. The computer system displays the information in the windows on the display devices in the flight deck of the aircraft in the display configuration, wherein the display configuration simplifies access to the information used by the pilot to perform the first set of tasks and the copilot to perform the second set of tasks.

Figure 1:
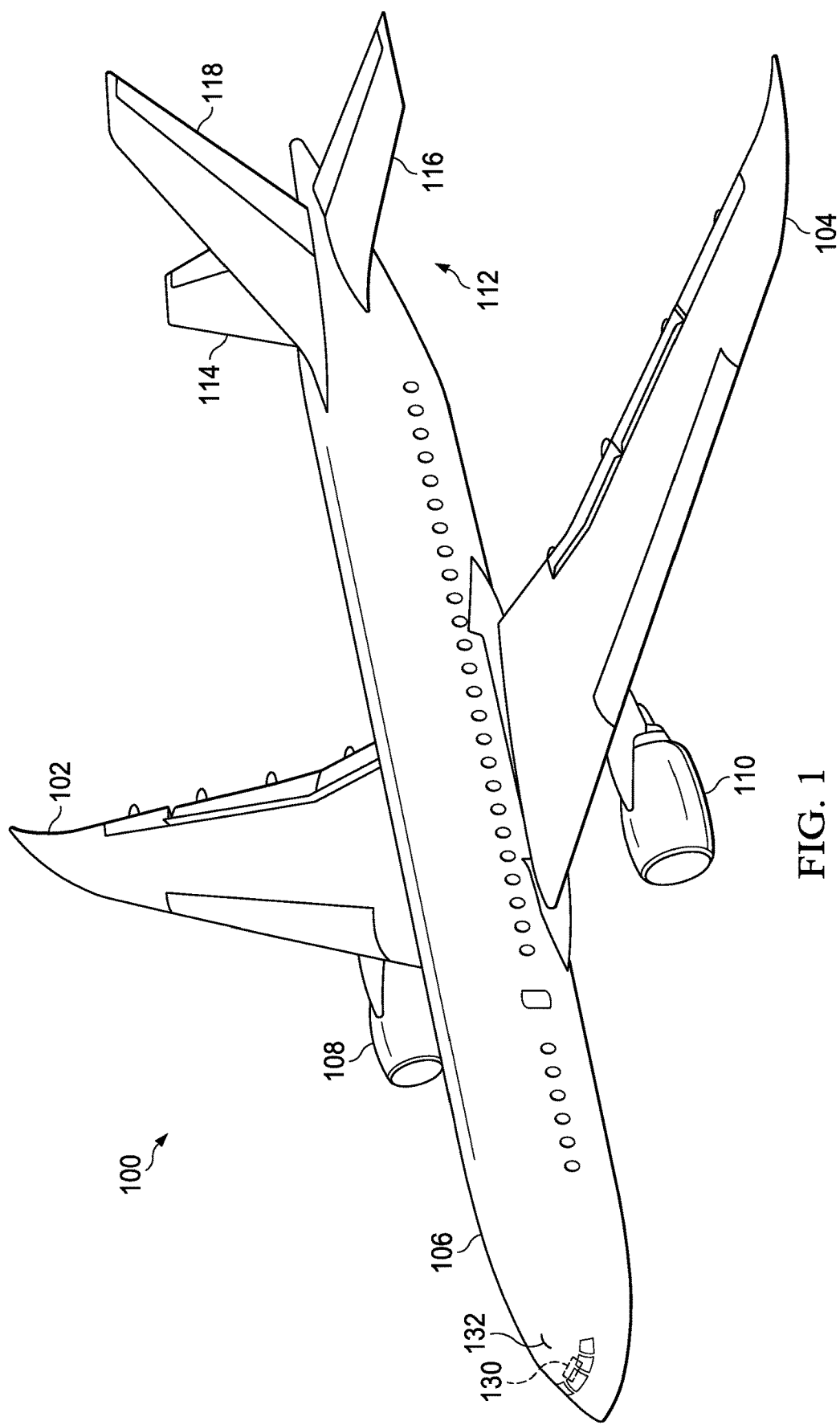
FIG. 1 is an illustration of an aircraft in accordance with an illustrative embodiment.

With reference now to the figures and, in particular, with reference to FIG. 1, an illustration of an aircraft is depicted in accordance with an illustrative embodiment. In this illustrative example, aircraft 100 has wing 102 and wing 104 attached to body 106. Aircraft 100 includes engine 108 attached to wing 102 and engine 110 attached to wing 104. Body 106 has tail section 112. Horizontal stabilizer 114, horizontal stabilizer 116, and vertical stabilizer 118 are attached to tail section 112 of body 106.

Aircraft 100 is an example of an aircraft in which an aircraft control system may be implemented in accordance with an illustrative embodiment. In this illustrative example, display system 130 in an aircraft control system is located in flight deck 132 of aircraft 100. Display system 130 can have a group of display devices utilized by a flight crew to operate aircraft 100. As used herein, "a group of," when used with reference to items, means one or more items. For example, "a group of display devices" is one or more display devices.

In this illustrative example, display system 130 includes display devices that operate in a manner that reduces at least one of a need for physical controls, complexity of information displayed, or enables directing attention of the flight crew to updates or changes in information displayed on the display device. As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

Figure 2:
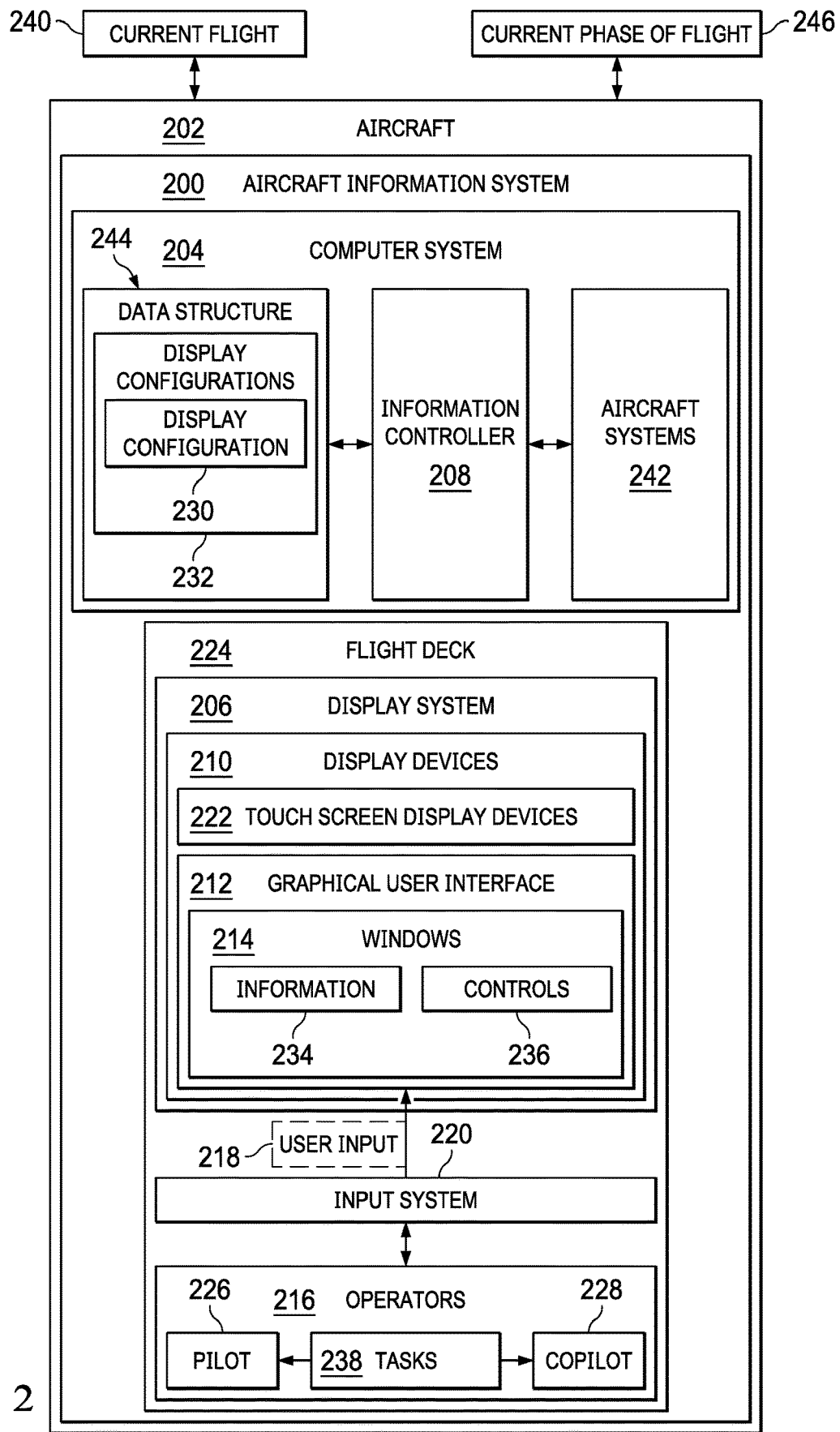
FIG. 2 is an illustration of a block diagram of an aircraft information system in accordance with an illustrative embodiment.

With reference now to FIG. 2, an illustration of a block diagram of an aircraft information system is depicted in accordance with an illustrative embodiment. In this illustrative example, aircraft information system 200 is located in aircraft 202. Aircraft 100 in FIG. 1 is an example of one implementation for aircraft 202 shown in block form in this figure.

In this illustrative example, aircraft control system 200 includes a number of different components. As depicted, aircraft control system 200 comprises computer system 204, display system 206, and information controller 208.

Computer system 204 is a physical hardware system and includes one or more data processing systems. When more than one data processing system is present, those data processing systems are in communication with each other using a communications medium. The communications medium may take different forms. In this example, the communications medium may include an Aeronautical Radio Incorporated (ARINC) bus system, a wireless network, a fiber-optic network, a wired network, or other types of communications mediums.

The data processing systems in computer system 204 can take a number of different forms. For example, the data processing systems may be selected from at least one of a computer, a server computer, a tablet, a line replaceable unit (LRU), or some other suitable data processing system.

As depicted, display system 206 is a physical hardware system for use with computer system 204 to display information. Display system 206 includes display devices 210 on which graphical user interface 212 may be displayed. Display devices 210 may include at least one of a light-emitting diode (LED) display, a liquid crystal display (LCD), a touch screen display, an organic light-emitting diode (OLED) display, a computer monitor, a projector, a flat panel display, or some other suitable device that can output information for a presentation of the information.

In this illustrative example, display system 206 is configured to display windows 214 in graphical user interface 212. A window is an area in graphical user interface 212 on a display device in which the information is displayed.

Operators 216 are people that may interact with graphical user interface 212 through user input 218 generated by input system 220 for computer system 204. Input system 220 is a physical hardware system and may be selected from at least one of a mouse, a keyboard, a trackball, a touchscreen, a stylus, a motion sensing input device, a cyber glove, or some other suitable type of input device.

In this particular example, display devices 210 are touchscreen display devices 222 in which at least a portion of input system 220 is integrated into touchscreen display devices 222. As depicted, display devices 210 are located in flight deck 224. One or more of display devices 210 can be part of a forward display in flight deck 224.

In this illustrative example, operators 216 is a number of flight crew in flight deck 224 of aircraft 202. In this illustrative example, operators 216 can be pilot 226 and copilot 228 for aircraft 202.

As depicted, windows 214 in graphical user interface 212 are arranged in display configuration 230. In this illustrative example, display configuration 230 is one configuration that is selected from a plurality of display configurations 232.

In this illustrative example, the plurality of display configurations 232 is stored in data structure 244. Data structure 244 can be selected from a group comprising a table, a database, a file, a linked list, and other suitable types of data structures.

In this illustrative example, display configurations 232 for windows 214 can be tailored to aircraft 202. In other words, other aircraft can have different display configurations based on what display devices are present and their locations in the other aircraft. As depicted, at least one of information 234 or controls 236 can be displayed in windows 234.

As depicted, information 234 can be received from a number of different sources. In this illustrative example, information 234 can be received from aircraft systems 242. As depicted, aircraft systems 242 can be selected from at least one of a flight management system, an engine, an aircraft flight control system, a fuel system, hydraulics, a navigation system, a radio, a weather system, a crew-alerting system, a video surveillance system, a communications system, a maintenance system, an electronic flight bag system, or some other suitable type of system in aircraft 202.

In the illustrative example, information controller 208 in computer system 204 controls the display of windows 214 to have different configurations selected from a plurality of display configurations 232. In other words, information controller 208 controls parameters such as size, position, and other parameters for how windows 214 can be displayed on display devices 210.

For example, information controller 208 displays information 234 in windows 214 on display devices 210 in computer system 204 in display configuration 230 that is selected based on a first set of tasks 238 assigned to pilot 226 for current flight 240 of aircraft 202 and a second set of tasks 238 assigned to copilot 228 for current flight 240 of aircraft 202. A set of tasks 238 can be for current phase of flight 246 of aircraft 202 such that when current phase of flight 246 changes then one or more tasks in at least one of the first set of tasks for pilot 226 or the second set of tasks for copilot 228 change. In this illustrative example, current phase of flight 246 can be selected from a group comprising on ground, takeoff, climb, cruise, descent, landing, at a gate, taxiing, or other phases of flight.

Tasks 238 can also change as tasks 238 are completed. Further, tasks 238 assigned to pilot 226 and copilot 228 can change between flights or during a flight. For example, pilot 226 and copilot 228 can exchange or swap one or more of tasks 238. Tasks 238 can take a number of different forms. For example, tasks 238 can include at least one of a preflight checklist, takeoff, flight plan modifications, radio communications, receiving or sending datalinks, a monitoring task, or other suitable types of tasks. In addition to tasks performed by pilot 226 and copilot 228 to fly aircraft 202, other operators in operators 216 can include at least one of a maintenance operator, a flight test operator, or a training operator personnel in which each operator can perform different tasks in tasks 238.

As depicted, display configuration 230 is selected from a plurality of display configurations 232 for display devices 210. In this illustrative example, display configuration 230 simplifies access to information 234 used by pilot 226 to perform the first set of tasks 238 and copilot 228 to perform the second set of tasks 238.

In this illustrative example, the display of windows 214 can dynamically change during current flight 240 of aircraft 202. For example, information controller 208 can change display configuration 230 to another display configuration in the plurality of display configurations 232 when a change occurs in at least one of the first set of tasks 238 assigned to pilot 226 or the second set of tasks 238 assigned to copilot 228.

Further, the selection of display configuration 230 can also be dependent on how many display devices 210 are available in display system 206 to display information 234. For example, information controller 208 can display windows 214 on display devices 210 for computer system 204 in display configuration 230 that is selected based on the first set of tasks 238 assigned to pilot 226 for the current flight 240 of the aircraft 202, the second set of tasks 238 assigned to copilot 228 for current flight 240 of aircraft 202, and how many of display devices 210 are available to display windows 214.

The number of display devices 210 available can change from aircraft to aircraft. Further, the number of display devices 210 also can change from flight to flight for aircraft 202. The availability of display devices 210 in display system 206 can also change during current flight 240. For example, a display device in display devices 210 in display system 206 can malfunction during current flight 240 or between flights of aircraft 202. In another example, a display device in display devices 210 in display system 206 can be removed or added to display system 206.

Further, information controller 208 can display both information 234 for an aircraft system in aircraft systems 242 and controls 236 for controlling the aircraft system in windows 214 on a touchscreen display device in touchscreen display devices 222. In this manner, an operator such as pilot 226 or copilot 228 can control the aircraft system using controls displayed on the same touchscreen display device as the window displaying information 234 for the aircraft system.

Additionally, flexibility is provided in enabling at least one of pilot 226 or copilot 228 to select or change one or more parameters for a window in windows 214. For example, information controller 208 can receive user input 218 to change a location of a window in windows 214 displayed on a shared display device in display devices 210 and display the window in the location changed by user input 218. This user input can be used to change the location of a window displayed on other display devices in addition to or in place of a shared display device. Further, information controller 208 can also receive user input 218 from at least one of pilot 226 or copilot 228 to select or change window dimensions, content, visibility, or other parameters for a window.

In one illustrative example, a multi-purpose window displaying operational information and supplementary information that is of interest to the flight crew is a window for which the location can be changed by user input 218. Examples of operational and/or supplemental information displayed on such a multi-purpose window include video feeds from a flight deck entry video, video feeds from other internal or external aircraft camera video, Automatic Dependent Surveillance-Broadcast (ADS-B) In traffic tools, electronic checklist, communications and datalink, maintenance applications, and electronic flight bag applications.

Information controller 208 can be implemented in software, hardware, firmware, or a combination thereof. When software is used, the operations performed by information controller 208 can be implemented in program code configured to run on hardware, such as a processor unit. When firmware is used, the operations performed by information controller 208 can be implemented in program code and data and stored in persistent memory to run on a processor unit. When hardware is employed, the hardware may include circuits that operate to perform the operations in information controller 208.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

In one illustrative example, one or more technical solutions are present that overcome a technical problem with a number of display devices and physical controls in a flight deck of an aircraft increasing a cognitive load or need for increased training. As a result, one or more technical solutions can provide a technical effect of providing simplicity and flexibility in configuring windows on display devices in the flight deck of the aircraft. One or more technical solutions can provide an ability to select a display configuration for display devices in the flight deck of the aircraft based on a first set of tasks assigned to a pilot for a current flight and a second set of tasks assigned to a copilot for the current flight of the aircraft.

Thus, the use of information controller 208 to select display configuration 230 based on a first set of tasks 238 assigned to pilot 226 for current flight 240 of aircraft 202 and a second set of tasks 238 assigned to copilot 228 for current flight 240 of aircraft 202 reduces the cognitive workload and can decrease a need for additional or increased training. Additionally, in the illustrative examples, display system 206 with display configurations 232 reduces the size of an aisle stand in flight deck 224. Thus, with reducing the amount of space needed to provide controls to a flight crew to operate aircraft 202, comfort of pilots and other flight crew in flight deck 224 of aircraft 202 also can be increased.

As a result, computer system 204 operates as a special purpose computer system in which information controller 208 in computer system 204 enables controlling display configurations 232 to display information 234 and controls 236 in a more efficient manner based on information 234 used by operators 216 to operate aircraft 202.

In particular, information controller 208 transforms computer system 204 into a special purpose computer system as compared to currently available general computer systems that do not have information controller 208. Computer system 204 can be configured to perform at least one of steps, operations, or actions described in the different illustrative examples using software, hardware, firmware, or a combination thereof.

Figure 3:
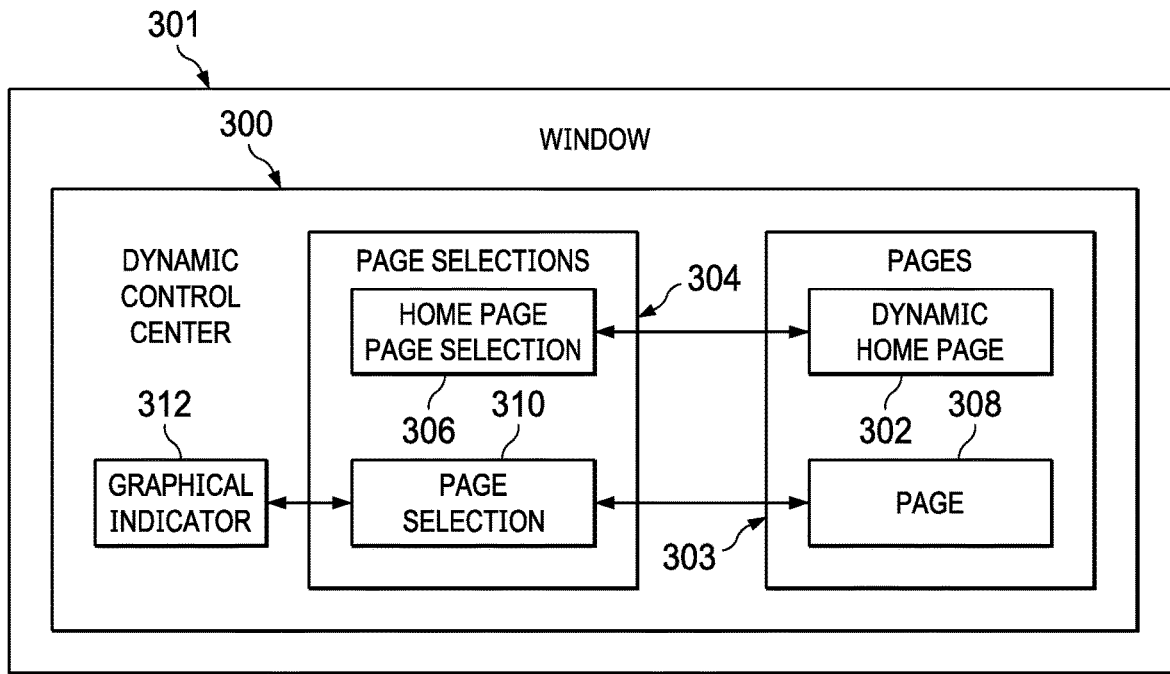
FIG. 3 is an illustration of a block diagram of a window for a dynamic control center in accordance with an illustrative embodiment.

With reference next to FIG. 3, an illustration of a block diagram of a window for a dynamic control center is depicted in accordance with an illustrative embodiment. In the illustrative examples, the same reference numeral may be used in more than one figure. This reuse of a reference numeral in different figures represents the same element in the different figures.

In this example, window 301 is an example of a window in windows 214 in FIG. 2. As depicted, information controller 208 displays window 301 in graphical user interface 212 on one of display devices 210 based on current phase of flight 246 for aircraft 202. Window 301 is a window that can be present in one or more of display configurations 232.

In this example, window 301 encompasses dynamic control center 300. In this illustrative example, information 234 in dynamic control center 300 is based on information 234 referenced during current phase of flight 246 to operate aircraft 202. In this example, information 234 can be information used by at least one of pilot 226 or copilot 228 to perform tasks 238. Further, information 234 in dynamic control center 300 changes as current phase of flight 246 changes.

In this depicted example, information controller 208 displays dynamic home page 302 as one of pages 303 in dynamic control center 300. In this illustrative example, pages 303 also include at least one of a flight plan page, a performance page, an air traffic control page, a communications page, an audio page, a setup page, or other suitable types of pages that can be used to display information 234 used to operate aircraft 202 in FIG. 2.

Pages 303 can be implemented in a number of different ways. For example, pages 303 can be web pages that include dynamic content such as information 234 that changes as current phase of flight 246 in FIG. 2 changes to reflect information 234 that is relevant or needed for operating aircraft 202 during current phase of flight 246.

In this illustrative example, information controller 208 also displays page selections 304 including home page selection 306 for dynamic home page 302 in dynamic control center 300. Page selections 304 may take the form of tabs or other graphical elements.

Information controller 208 displays page 308 in pages 303 assigned to page selection 310 in page selections 304 when user input 218 in FIG. 2 selects page selection 310. This user input can be generated by one of operators 216 in FIG. 2 touching the display of page selection 310 in dynamic control center 300 in graphical user interface 212 displayed on a touchscreen display device in touchscreen display devices 222 in FIG. 2.

In the illustrative example, dynamic home page 302 is the default page in pages 303 displayed in dynamic control center 300. As depicted in the illustrative example, information controller 208 displays dynamic home page 302 in dynamic control center 300 in graphical user interface 212 on display devices 210.

Dynamic home page 302 includes information 234 referenced by one of operators 216 during current phase of flight 246 to operate aircraft 202 and a group of controls 236 used during current phase of flight 246 to operate aircraft 202. Information 234 and controls 236 in other pages of pages 303 also may be based on at least one of current phase of flight 246 or preselected information that may be referenced at any time during operation of aircraft 202.

Further, information controller 208 displays graphical indicator 312 on page selection 310 when new information is present for page 308 assigned to page selection 310. In this illustrative example, graphical indicator 312 can take a number of different forms. Graphical indicator 312 can be selected as any type of graphic that draws attention of operators 216 to page selection 310. For example, graphical indicator 312 can be selected from at least one of an icon, flashing text, animation, bolding, font size, color, or some other suitable graphic.

Figure 4:
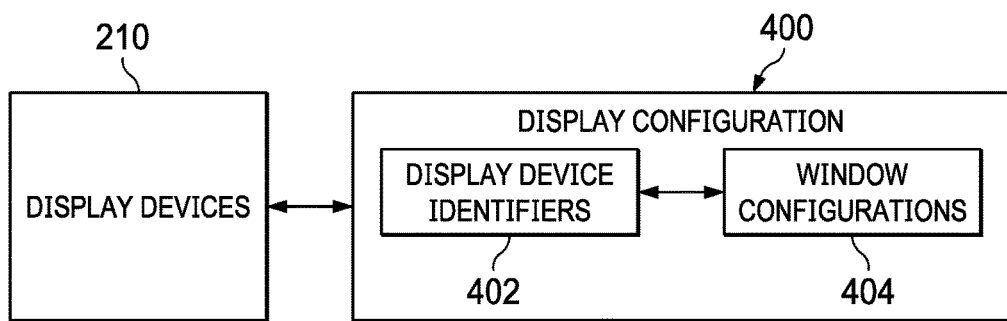
FIG. 4 is an illustration of a block diagram of a display configuration in accordance with an illustrative embodiment.

Turning to FIG. 4, an illustration of a block diagram of a display configuration is depicted in accordance with an illustrative embodiment. In this figure, display configuration 400 is an illustrative example of a display configuration in display configurations 232 in FIG. 2.

As depicted, display configuration 400 includes display device identifiers 402 for each display device in display devices 210 that will be used. Different display configurations may have different numbers of display devices that are identified by display device identifiers 402.

For example, display configuration 400 includes three display device identifiers that identify a pilot display, a center display, and a copilot display. In another example, display configuration 400 may only include two display device identifiers that identify the pilot display and the copilot display. With this example, a center display between the pilot and the copilot may be absent or not working.

In this illustrative example, window configurations 404 are present for display device identifiers 402. Each display device in display device identifiers 402 has a corresponding window configuration in window configurations 404. These window configurations can also be referred to as personalities in the illustrative examples.

For example, when three display devices are present, a window configuration is present in window configurations 404 for each of the three display devices. The window configuration for a display device identifies the configuration of the windows for the display device. For example, the window configuration identifies a number of windows, sizes of the windows, locations of the windows, content of the windows, and other suitable information about the windows for a particular display device.

The illustration of aircraft control system 200 and the different components in FIGS. 2-4 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, operators 216 can also include a flight engineer or observer in flight deck 224 in addition to pilot 226 and copilot 228. In this example, the flight engineer can use display devices 210 to help monitor and operate aircraft 202.

Turning now to FIG. 5, an illustration of a table of display configurations is depicted in accordance with an illustrative embodiment. As depicted, table 500 is an example of one implementation for data structure 244 shown in block form in FIG. 2. As depicted, table 500 stores display configurations for display devices in a display system in a flight deck of an aircraft.

As depicted, table 500 stores 13 display configurations for display devices in the flight deck of the aircraft. Table 500 includes entry 502, entry 504, entry 506, entry 508, entry 510, entry 512, entry 514, entry 516, entry 518, entry 520, entry 522, entry 524, and entry 526.

In this illustrative example, number of display devices operable column 530 identifies the number of display devices that are available. As depicted, three is the maximum number of display devices, and one is the minimum number of display devices contemplated by table 500.

Location column 532 identifies a location of an engine-indicating and crew-alerting system (EICAS) window and a system pages (SYS) window. In this example, a system pages window includes information about aircraft systems such as hydraulics, electrical, propulsion, flight controls, environmental, or other systems in the aircraft. In table 500, the locations are left, right, and center. These locations are based on the pilot or user facing the display in the flight deck. This can be used to identify an entry for a display configuration in table 500 for use based on the location selected.

As depicted, multifunction display size column 534 indicates whether a multifunction display uses a half window or full window in size. In this example, the multifunction display can display information used to operate the aircraft. For example, the multifunction display can display at least one of a video feed from a flight deck entry video, video feeds from other internal or external aircraft camera video, Automatic Dependent Surveillance-Broadcast (ADS-B) In traffic tools, electronic checklist, communications and datalink, maintenance applications, electronic flight bag applications, or other suitable types of information. Multifunction display size column 534 can be used to identify an entry for display configuration based on the size selected for the multifunction display when all three of the display devices are operable.

In this illustrative example, multifunction display reversion column 536 can be used to identify an entry in table 500 for the display configuration if not all of the display devices or operable. Multifunction display reversion column 536 indicates whether a multifunction display (MFD) is selected to be present in place of a navigation display when the number of operable display devices decreases to a number less than three.

As depicted, left window configuration column 538 is the window configuration for the display device on the left side (pilot) of the flight deck when facing forward in the flight deck. Center window configuration column 540 is the window configuration for the center display device in the flight deck when facing forward in the flight deck. Right window configuration 542 is the window configuration for the display device on the right side (copilot) of the flight deck when facing forward in the flight deck.

Turning next to FIGS. 6-18, pictorial illustrations of window configuration display devices in a flight deck are depicted in accordance with an illustrative embodiment. As depicted, illustrative examples of window configurations are shown for the entries in table 500 in FIG. 5 in accordance with an illustrative embodiment. These window configurations are examples of implementations of window configurations 404 shown in block form in FIG. 4.

In this illustrative example, the window configurations in FIGS. 6-12 are for a normal condition when all of the display devices are available to display information. The window configurations in FIGS. 13-18 are for a reversion condition in which one or more of the display devices in the flight deck are unavailable to display information.

Figure 6:
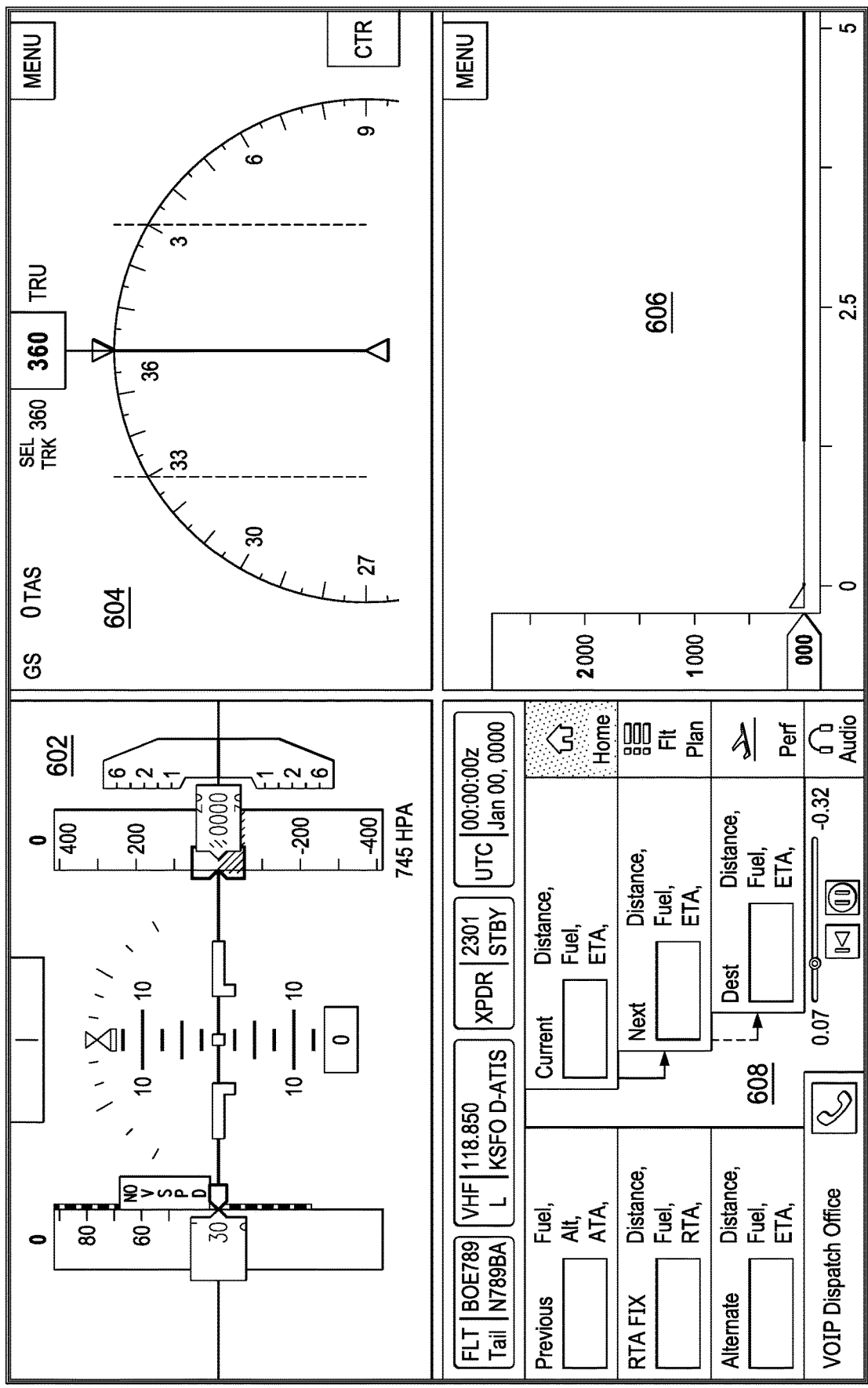
FIG. 6 is an illustration of a pilot 1 window configuration in accordance with an illustrative embodiment.

With reference first to FIG. 6, an illustration of a pilot 1 window configuration is depicted in accordance with an illustrative embodiment. In this illustrative example, pilot 1 window configuration 600 is an example of an implementation of how windows can be configured for the pilot 1 window configuration in table 500 in FIG. 5.

As depicted, pilot 1 window configuration 600 includes windows for primary flight display 602, navigation display 604, vertical situation display 606, and dynamic control center 608. These windows are configured for pilots to use when operating an aircraft.

Figure 7:
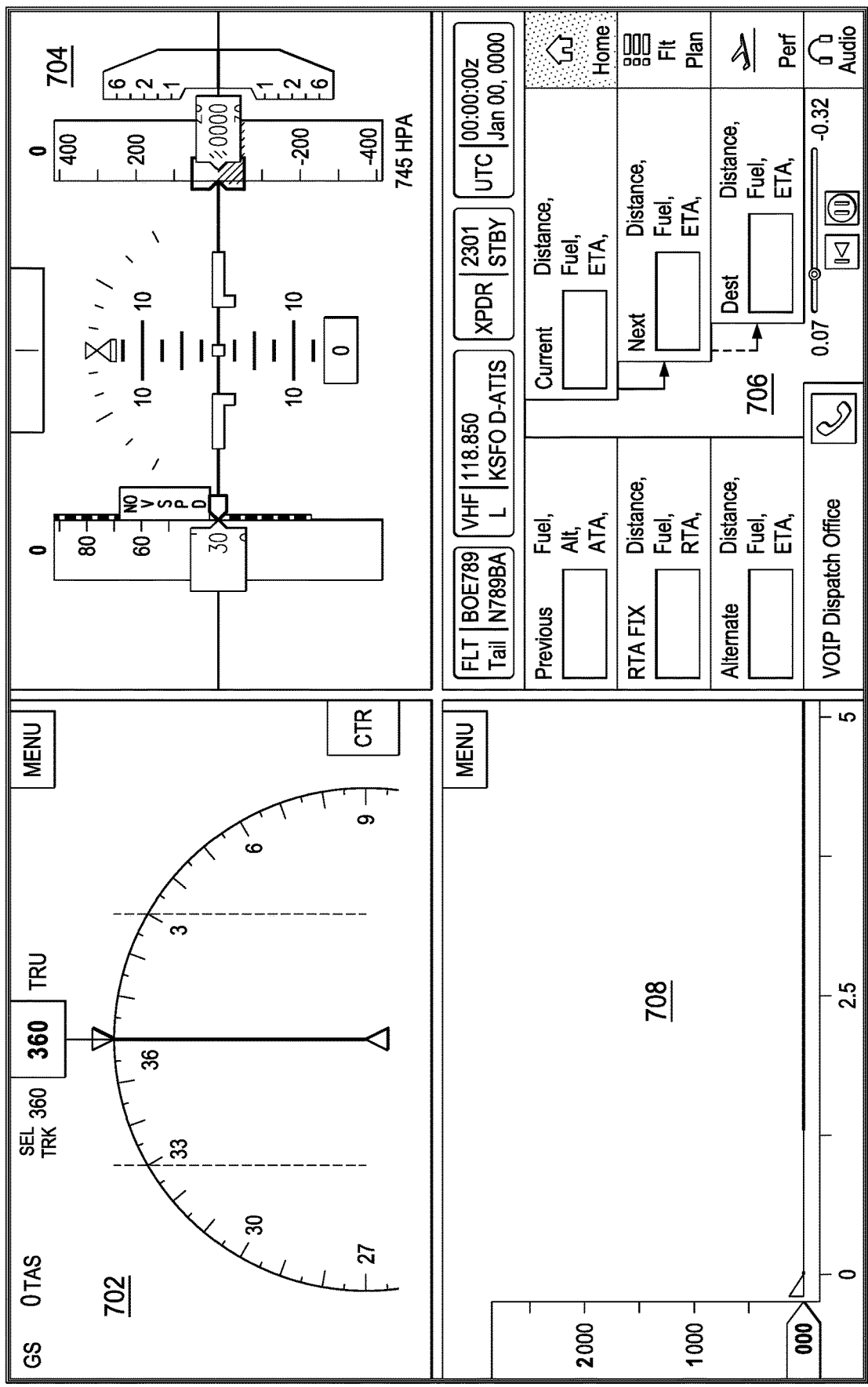
FIG. 7 is an illustration of a copilot 1 window configuration in accordance with an illustrative embodiment.

Turning next to FIG. 7, an illustration of a copilot 1 window configuration is depicted in accordance with an illustrative embodiment. In this illustrative example, copilot 1 window configuration 700 is an example of an implementation of how windows can be configured for a copilot 1 window configuration in table 500 in FIG. 5.

As depicted, copilot 1 window configuration 700 includes windows for navigation display 702, primary flight display 704, dynamic control center 706, and vertical situation display 708. Although the windows in copilot 1 window configuration 700 are the same type of windows as in pilot 1 window configuration 600, the placement of the windows is different. The placement of the windows can be selected based on at least one of the location of the display device for the tasks performed by a particular crew member primarily using the display device.

Figure 8:
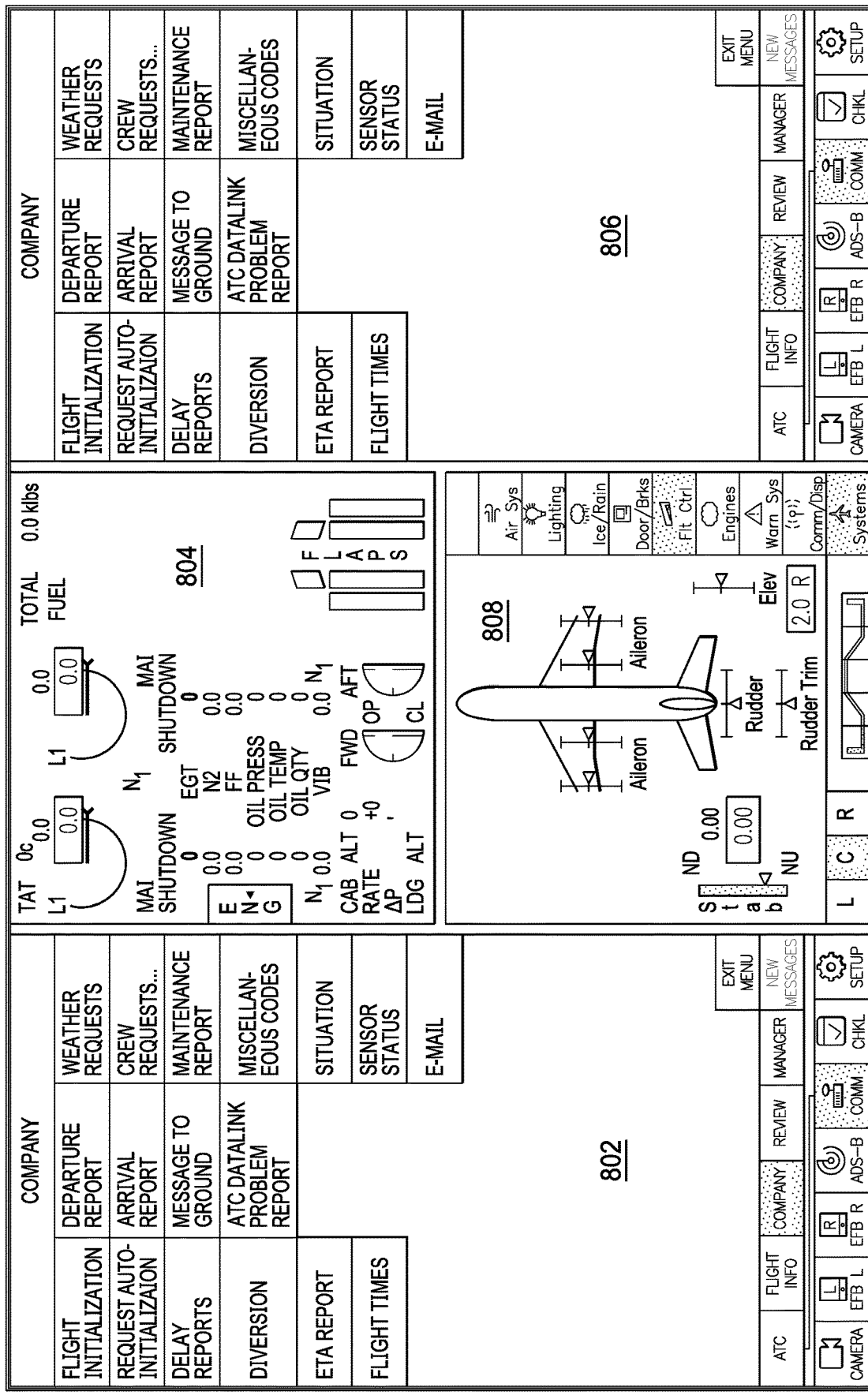
FIG. 8 is an illustration of a center 1 window configuration in accordance with an illustrative embodiment.

Next, in FIG. 8, an illustration of a center 1 window configuration is depicted in accordance with an illustrative embodiment. In this illustrative example, center 1 window configuration 800 is an example of an implementation of how windows can be configured for a center 1 window configuration in table 500 in FIG. 5.

As depicted, center 1 window configuration 800 includes windows for multifunction display 802, engine-indicating and crew-alerting system display 804, multifunction display 806, and system display 808. The configuration of these windows is selected for use on a display device that is located between a pilot and a copilot in this illustrative example.

In this illustrative example, multifunction display 802 and multifunction display 806 each use ⅓ of a display area on the display device.

Figure 9:
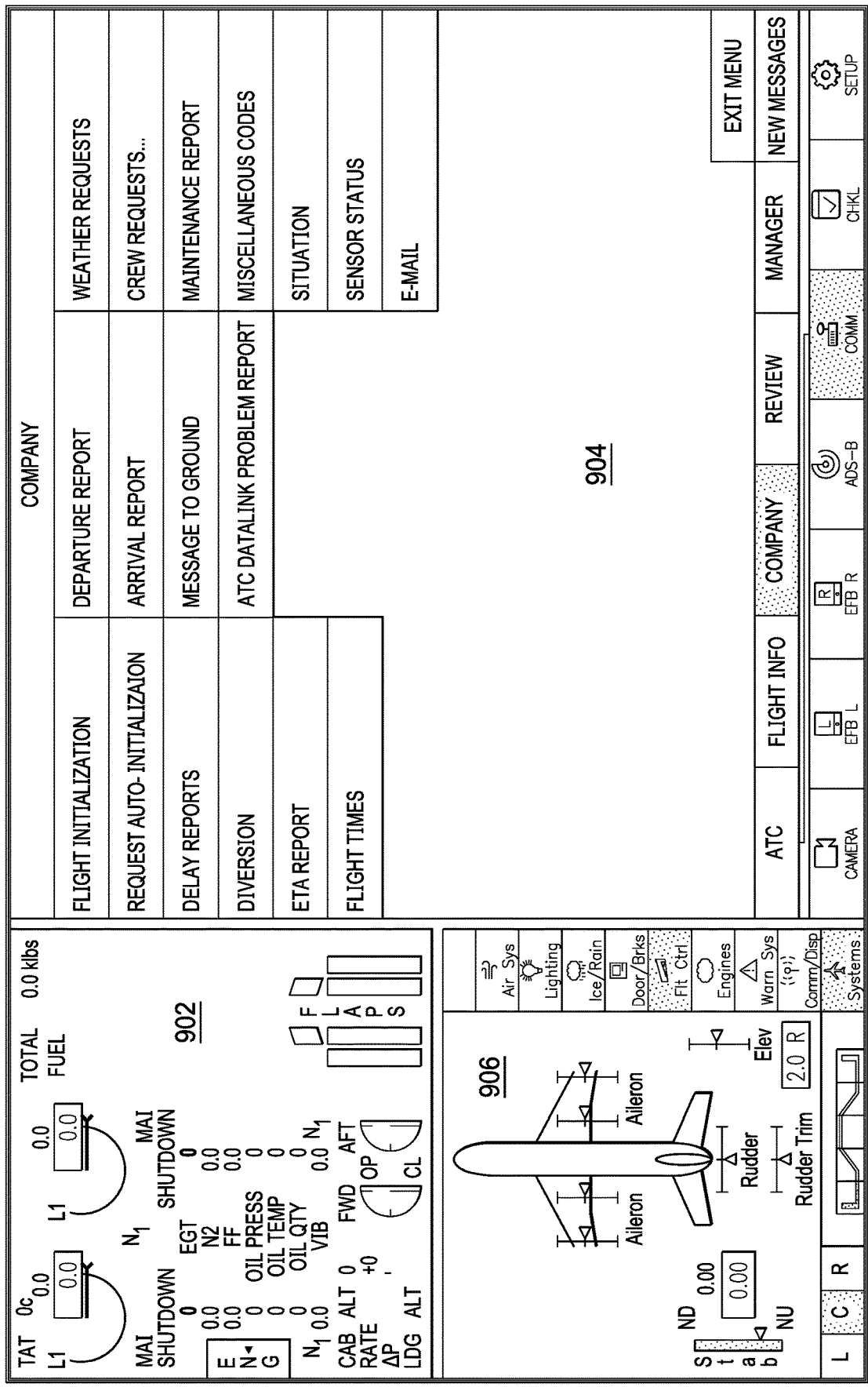
FIG. 9 is an illustration of a center 2 window configuration in accordance with an illustrative embodiment.

With reference to FIG. 9, an illustration of a center 2 window configuration is depicted in accordance with an illustrative embodiment. In this illustrative example, center 2 window configuration 900 is an example of an implementation of how windows can be configured for a center 2 window configuration in table 500 in FIG. 5.

As depicted, center 2 window configuration 900 includes windows for engine-indicating and crew-alerting system display 902, multifunction display 904, and systems display 906. Multifunction display 904 uses ⅔ of a display area on a display device.

Figure 10:
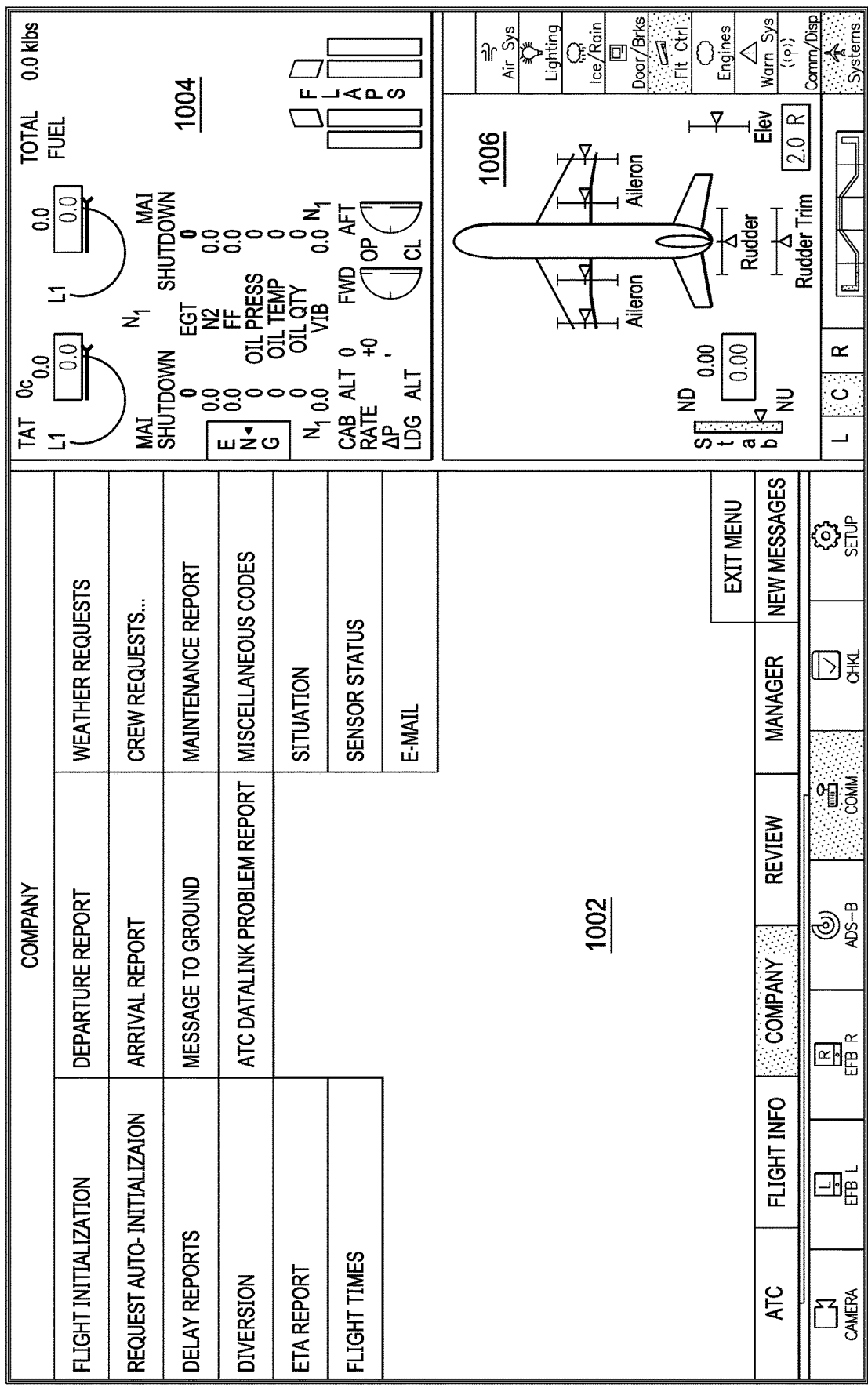
FIG. 10 is an illustration of a center 3 window configuration in accordance with an illustrative embodiment.

Next, FIG. 10 is an illustration of a center 3 window configuration depicted in accordance with an illustrative embodiment. In this illustrative example, center 3 window configuration 1000 is an example of an implementation of how windows can be configured for a center 3 window configuration used in table 500 in FIG. 5.

As depicted, center 3 window configuration 1000 includes windows for multifunction display 1002, engine-indicating and crew-alerting system display 1004, and systems display 1006. This window configuration is a mirror image to center 2 window configuration 900 in FIG. 9.

Figure 11:
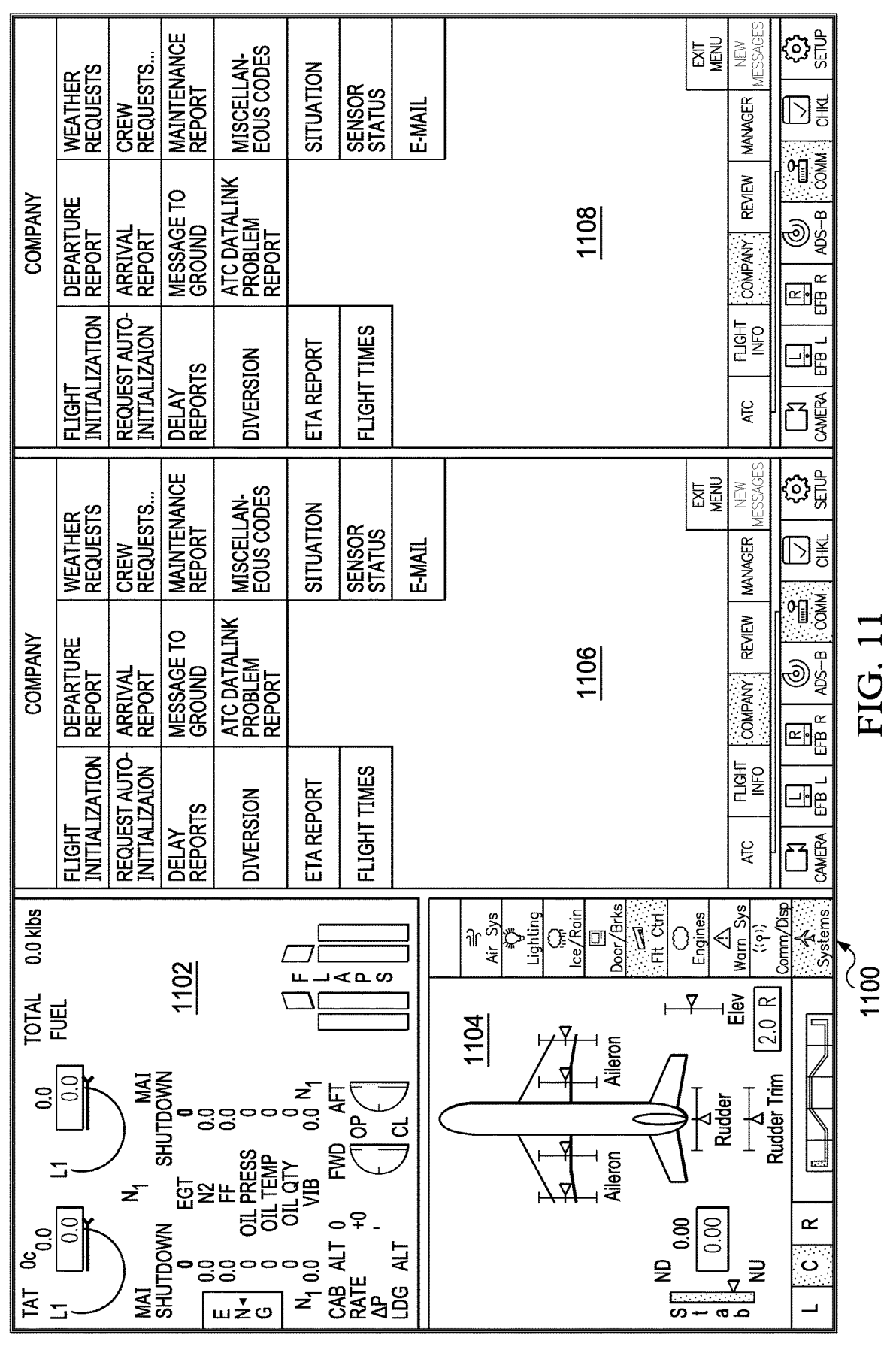

With reference now to FIG. 11, an illustration of a center 4 window configuration is depicted in accordance with an illustrative embodiment. In this illustrative example, center 4 window configuration 1100 is an example of an implementation of how windows can be configured for a center 4 window configuration in table 500 in FIG. 5.

As depicted, center 4 window configuration 1100 includes windows for engine-indicating and crew-alerting system display 1102, systems display 1104, multifunction display 1106, and multifunction display 1108. In this example, the multifunction displays each use ⅓ of a display area on a display device.

Figure 12:
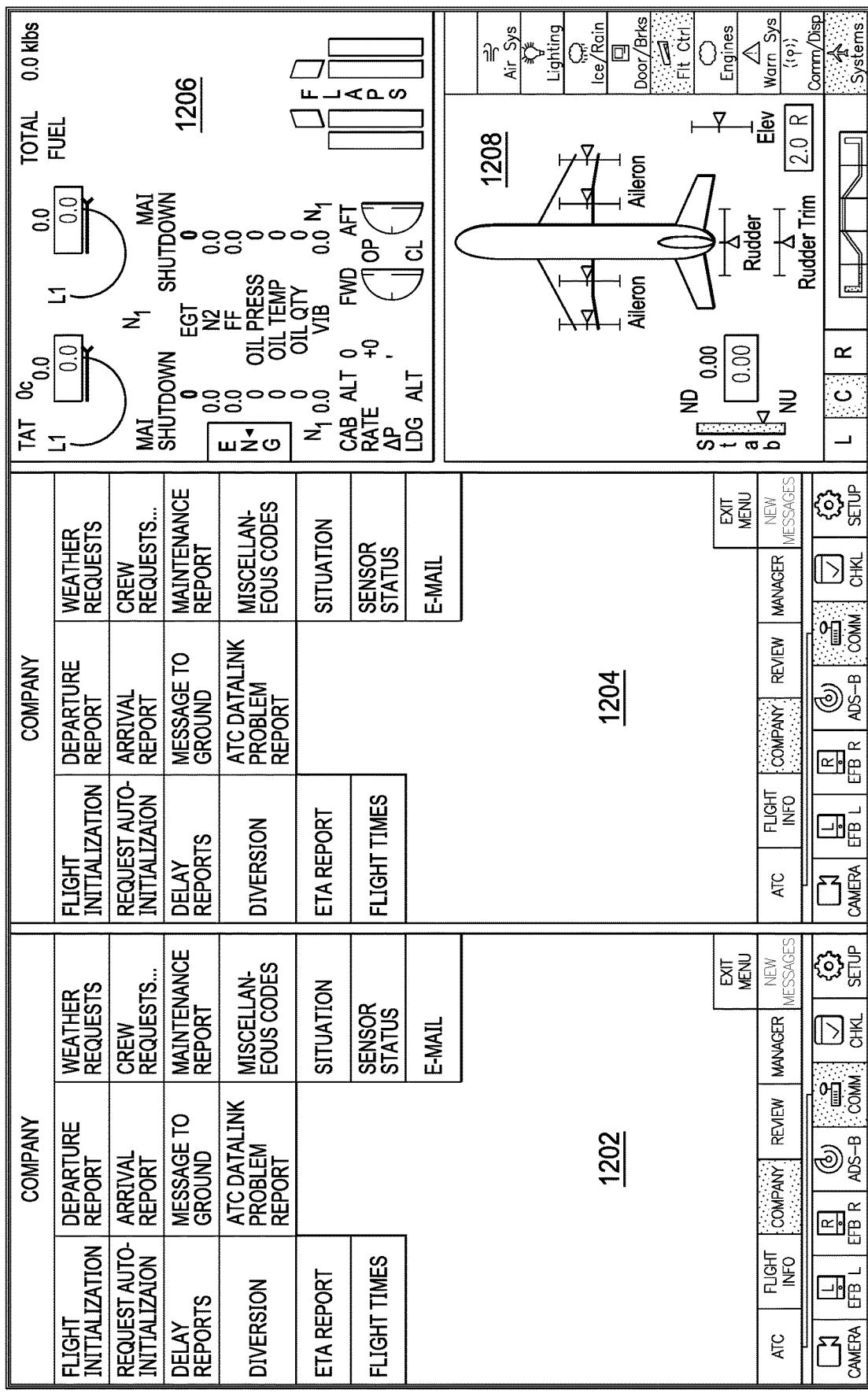
FIG. 12 is an illustration of the center 5 window configuration in accordance with an illustrative embodiment.

Turning next to FIG. 12, an illustration of a center 5 window configuration is depicted in accordance with an illustrative embodiment. In this illustrative example, center 5 window configuration 1200 is an example of an implementation of how windows can be configured for a center 5 window configuration in table 500 in FIG. 5.

In this example, center 5 window configuration 1200 includes windows for multifunction display 1202, multifunction display 1204, engine-indicating and crew-alerting system display 1206, and systems display 1208. The configuration of the windows in center 5 windows configuration 1200 is a mirror image of center 4 windows configuration 1100 in FIG. 11.

Figure 13:
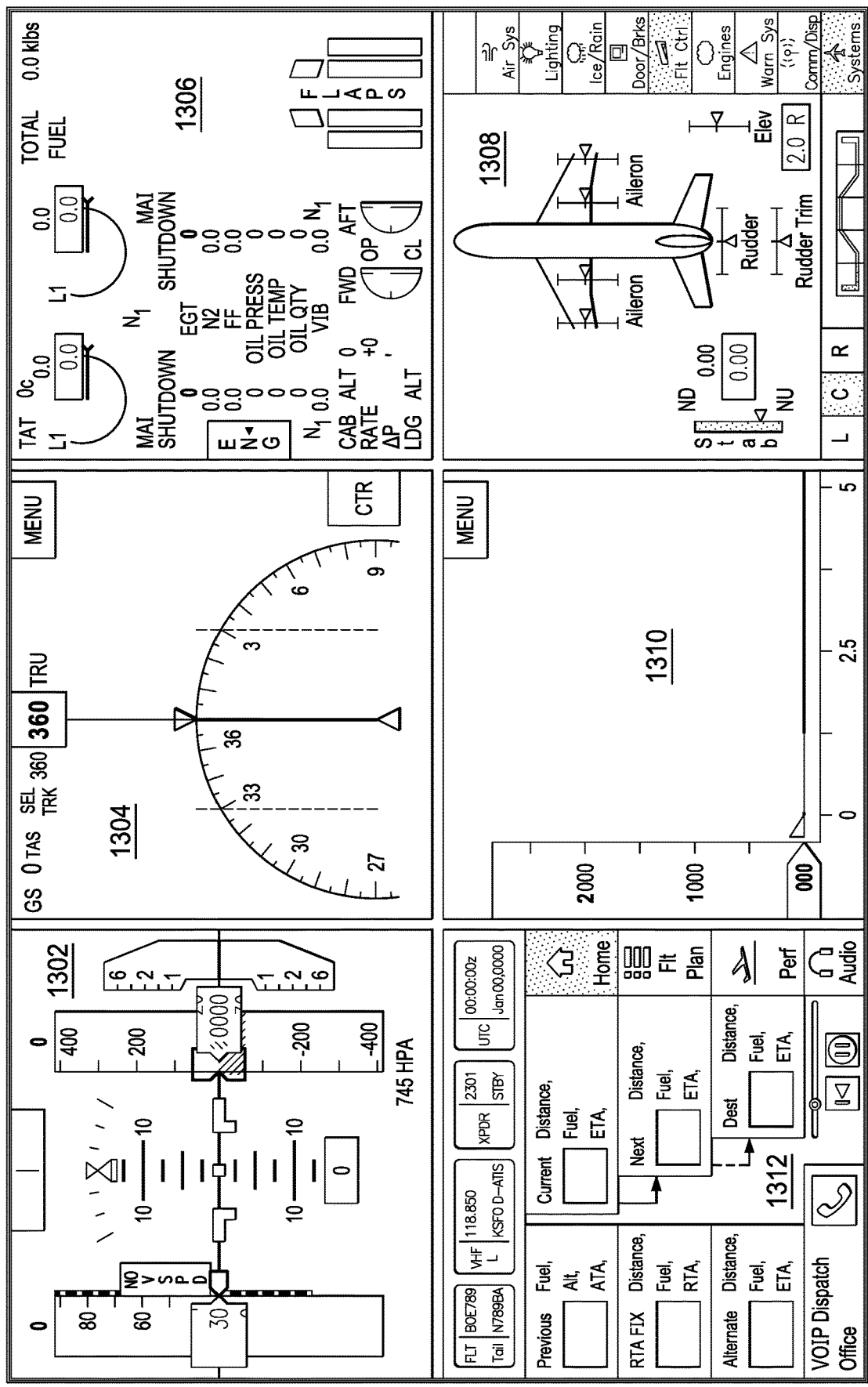
FIG. 13 is an illustration of a pilot 2 window configuration in accordance with an illustrative embodiment.

In FIG. 13, an illustration of a pilot 2 window configuration is depicted in accordance with an illustrative embodiment. In this illustrative example, pilot 2 window configuration 1300 is an example of an implementation of how windows can be configured for a pilot 2 window configuration in table 500 in FIG. 5.

In this example, pilot 2 window configuration 1300 includes windows for primary flight display 1302, navigation display 1304, engine-indicating and crew-alerting system display 1306, systems display 1308, vertical situation display 1310, and dynamic control center 1312. This configuration can be used when a display device is unavailable.

Figure 14:
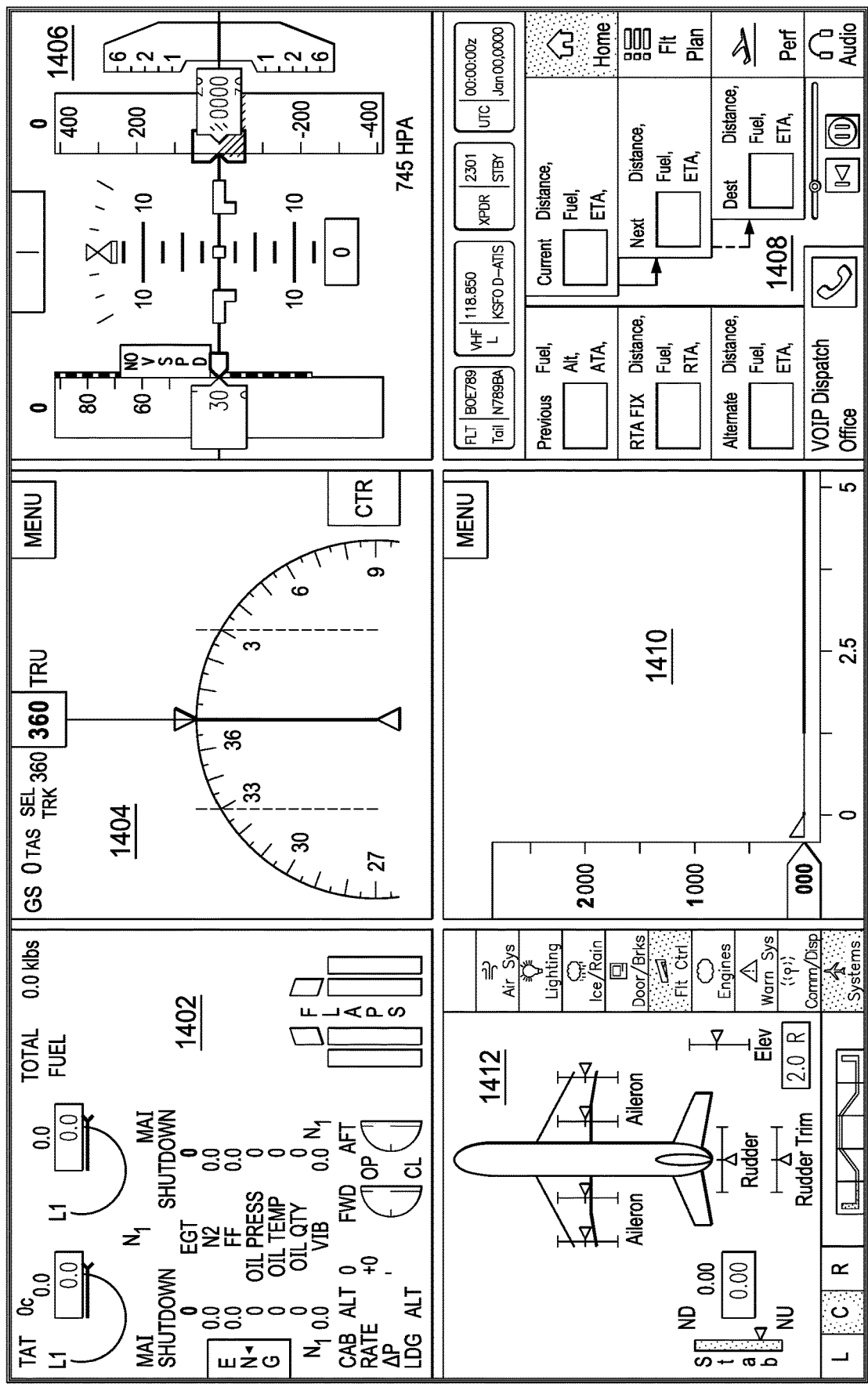
FIG. 14 is an illustration of a copilot 2 window configuration in accordance with an illustrative embodiment.

With reference to FIG. 14, an illustration of a copilot 2 window configuration is depicted in accordance with an illustrative embodiment. In this illustrative example, copilot 2 window configuration 1400 is an example of an implementation of how windows can be configured for a copilot 2 window configuration in table 500 in FIG. 5.

In this example, copilot 2 window configuration 1400 includes windows for engine-indicating and crew-alerting system display 1402, navigation display 1404, primary flight display 1406, dynamic control center 1408, vertical situation display 1410, and systems display 1412. This configuration can be used when a display device is unavailable. Copilot 2 window configuration 1400 is a mirror image of pilot 2 window configuration 1300 in FIG. 13.

Figure 15:
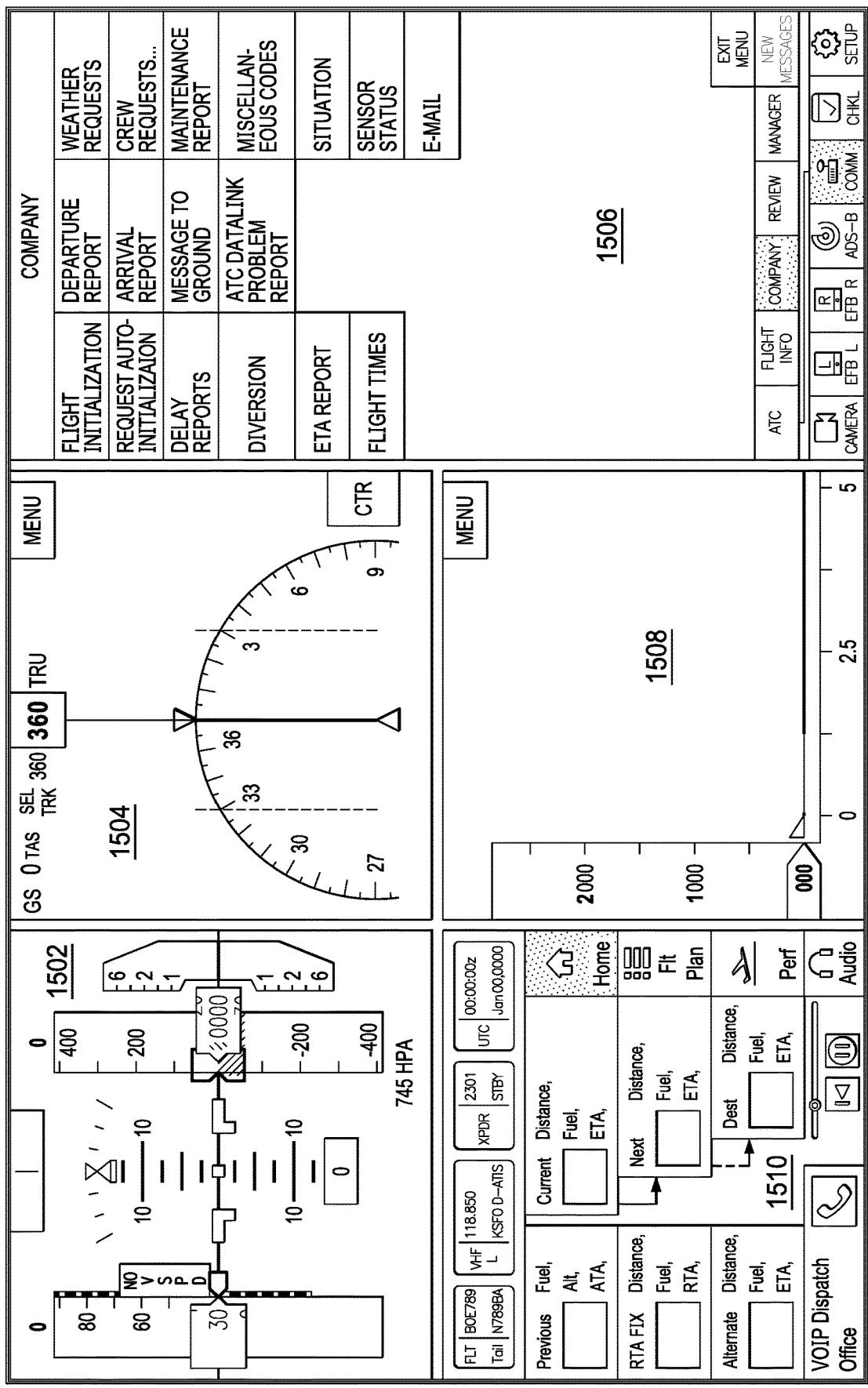
FIG. 15 is an illustration of a pilot 3 window configuration in accordance with an illustrative embodiment.

With reference now to FIG. 15, an illustration of a pilot 3 window configuration is depicted in accordance with an illustrative embodiment. In this illustrative example, pilot 3 window configuration 1500 is an example of an implementation of how windows can be configured for a pilot 3 window configuration in table 500 in FIG. 5.

In this example, pilot 3 window configuration 1500 includes windows for primary flight display 1502, navigation display 1504, multifunction display 1506, vertical situation display 1508, and dynamic control center 1510. This configuration can be used when a display device is unavailable in a flight deck. Multifunction display 1506 uses ⅓ of the display area on the display device.

Figure 16:
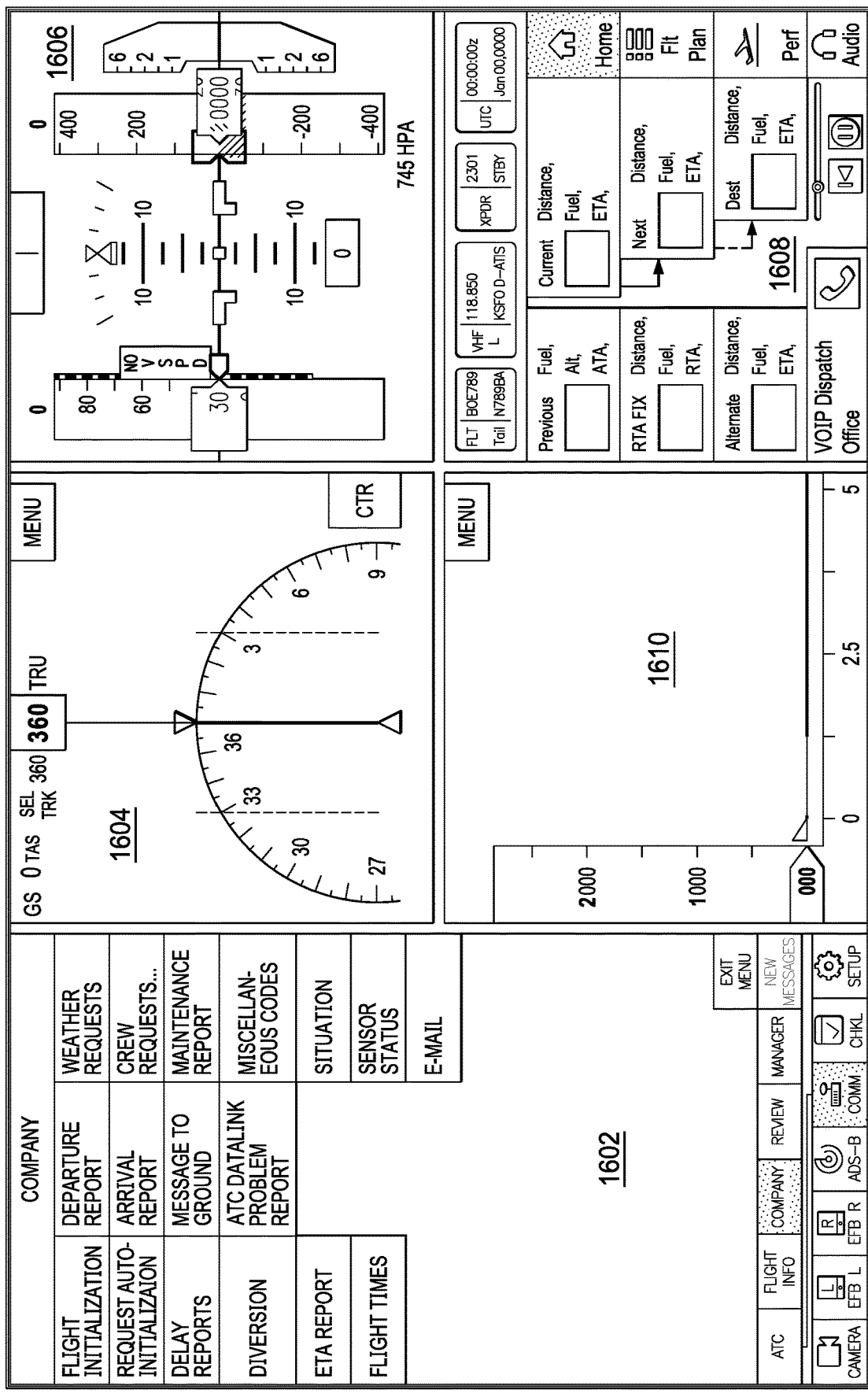
FIG. 16 is an illustration of a copilot 3 window configuration in accordance with an illustrative embodiment.

With reference to FIG. 16, an illustration of a copilot 3 window configuration is depicted in accordance with an illustrative embodiment. In this illustrative example, copilot 3 window configuration 1600 is an example of an implementation of how windows can be configured for a copilot 3 window configuration in table 500 in FIG. 5.

In this example, copilot 3 window configuration 1600 includes windows for multifunction display 1602, navigation display 1604, primary function display 1606, dynamic control center 1608, and vertical situation display 1610. This configuration can be used when a display device is unavailable in a flight deck. Copilot 3 window configuration 1600 is a mirror image of pilot 3 window configuration 1500 in FIG. 15.

Figure 17:
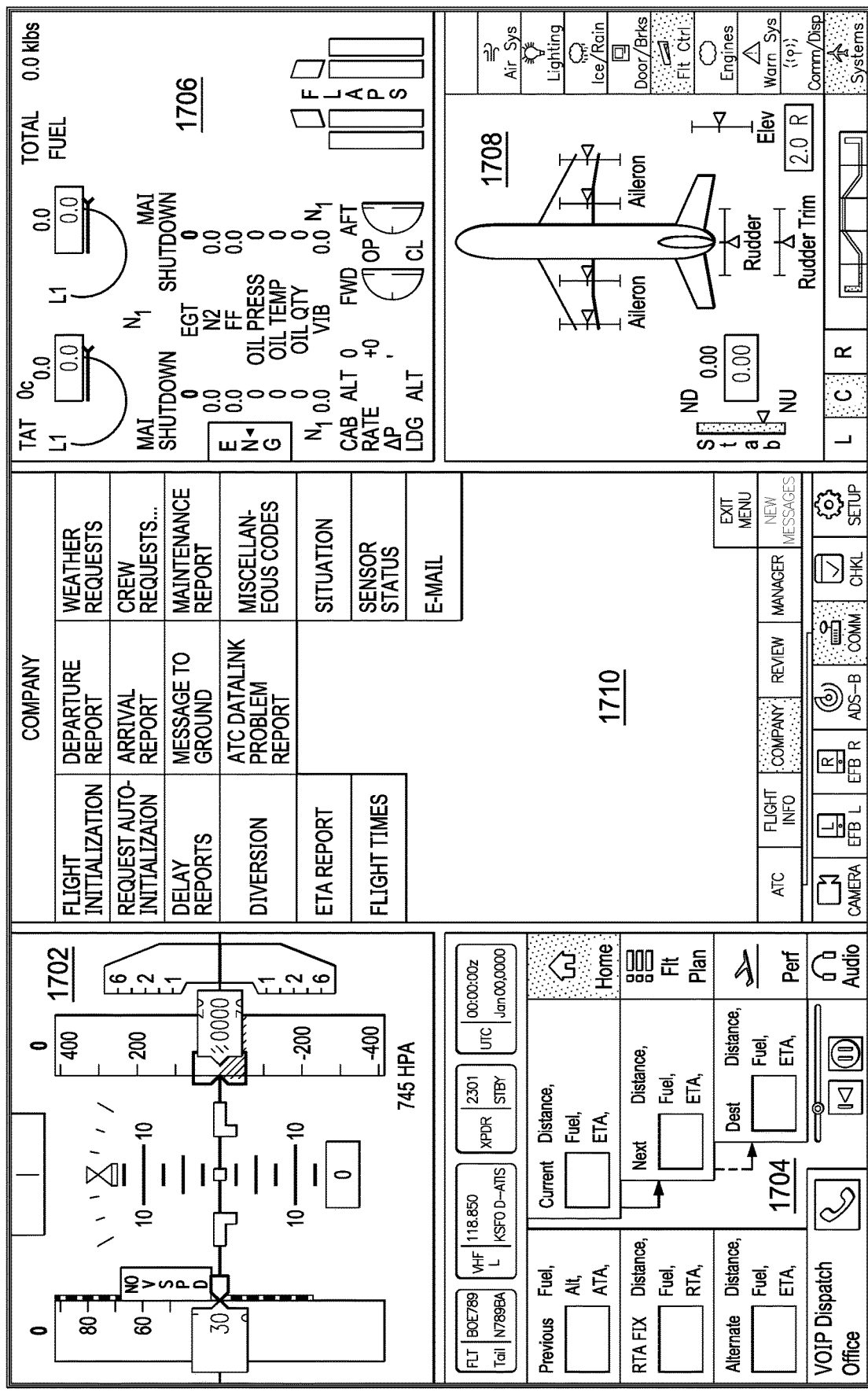
FIG. 17 is an illustration of a pilot 4 window configuration in accordance with an illustrative embodiment.

Turning to FIG. 17, an illustration of a pilot 4 window configuration is depicted in accordance with an illustrative embodiment. In this illustrative example, pilot 4 window configuration 1700 is an example of an implementation of how windows can be configured for a pilot 4 window configuration in table 500 in FIG. 5.

In this example, pilot 4 window configuration 1700 includes windows for primary flight display 1702, dynamic control center 1704, engine-indicating and crew-alerting system display 1706, systems display 1708, and multifunction display 1710. This configuration can be used when a center display device is unavailable in a flight deck. Multifunction display 1710 uses ⅓ of a display area on a display device, and is located in the center of the display device.

Figure 18:
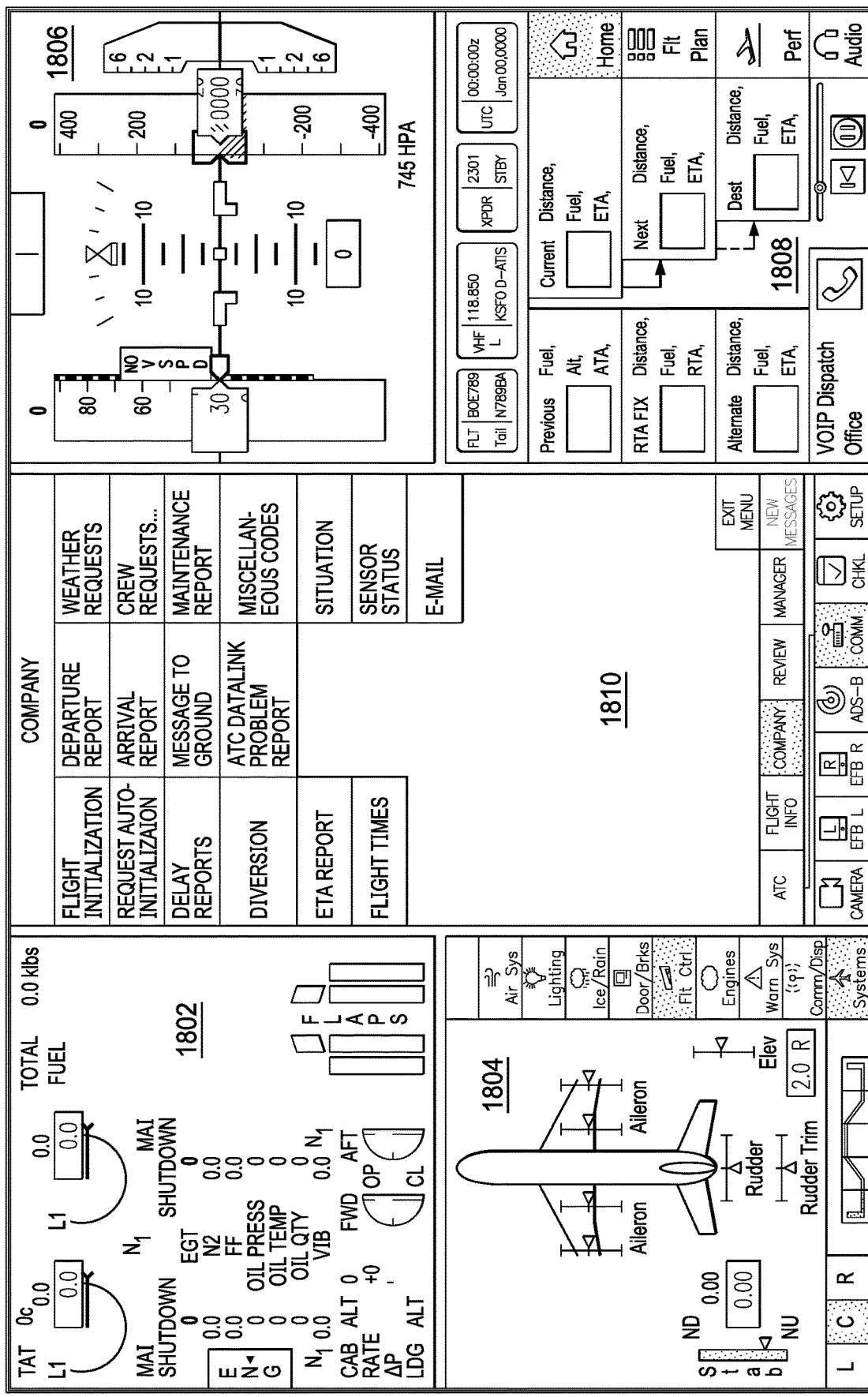
FIG. 18 is an illustration of a copilot 4 window configuration in accordance with an illustrative embodiment.

Next, FIG. 18 is an illustration of a copilot 4 window configuration in accordance with an illustrative embodiment. In this illustrative example, copilot 4 window configuration 1800 is an example of an implementation of how windows can be configured for a copilot 4 window configuration in table 500 in FIG. 5.

In this example, copilot 4 window configuration 1800 includes windows for engine indicating and crew alerting system display 1802, systems display 1804, primary flight display 1806, dynamic control center 1808, and multifunction display 1810.

This window configuration can be used when a display device is unavailable in a flight deck. This window configuration is a mirror image of pilot 4 windows configuration 1700 in FIG. 7.

The illustrations of FIGS. 6-18 have been presented to illustrate one manner in which window configurations can be implemented for forming display configurations for display devices in the flight deck of an aircraft. These illustrations are not meant to limit the manner in which other illustrative examples can be implemented.

For example, pilot window configurations and copilot window configurations can be used in other examples. Further, other sizes of windows can be used depending on the size of the display devices. As the size of a display device increases, additional windows can be used. For example, pilot 1 window configuration can have 2 additional windows depending on the size of the display devices used to display pilot 1 window configuration 600 in FIG. 6. For example, additional multifunction windows can be added as the size of the display device increases while still maintaining a desired comprehensibility of the windows.

Figure 19:
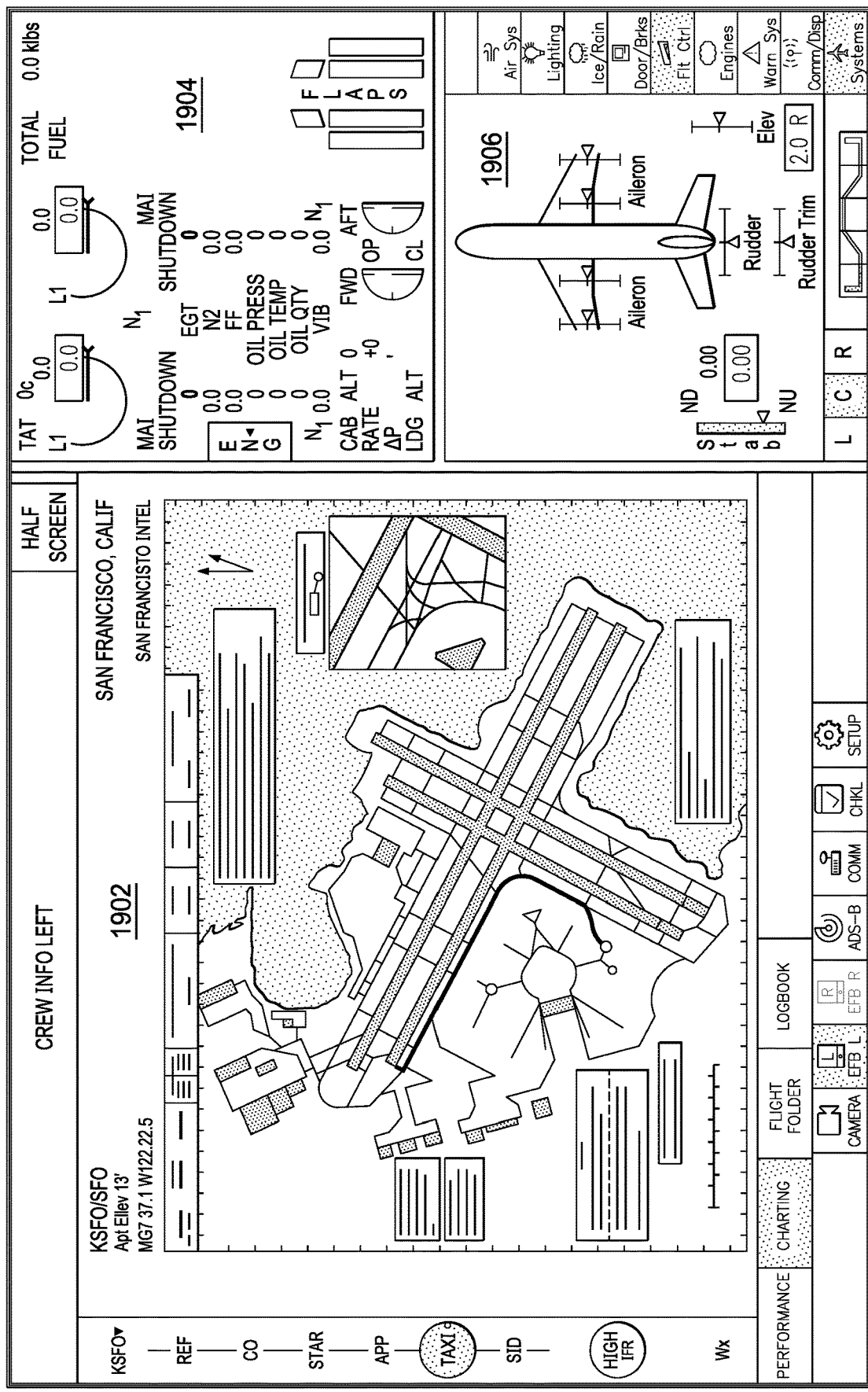
FIG. 19 is an illustration of a window configuration for a display device used by a pilot in accordance with an illustrative embodiment.

Turning now to FIG. 19, an illustration of a window configuration for a display device used by a pilot is depicted in accordance with an illustrative embodiment. In this illustrative example, window configuration 1900 is an example of a window configuration of windows in window configurations 404 configured for display on a display device in display devices 210 for use by pilot 226 to perform a first set of tasks 238 assigned to pilot 226 in FIG. 2.

In this example, window configuration 1900 includes an airport charting feature on Electronic Flight Bag window 1902, engine-indicating and crew-alerting system display 1904, and system display 1906. Airport display 1902 can be generated using an electronic flight bag in computer system 204. Electronic Flight Bag window 1902 can be used by a pilot to look at taxi route clearance from a gate to a takeoff runway as a task in tasks 238 in FIG. 2 to taxi to the runway.

Figure 20:
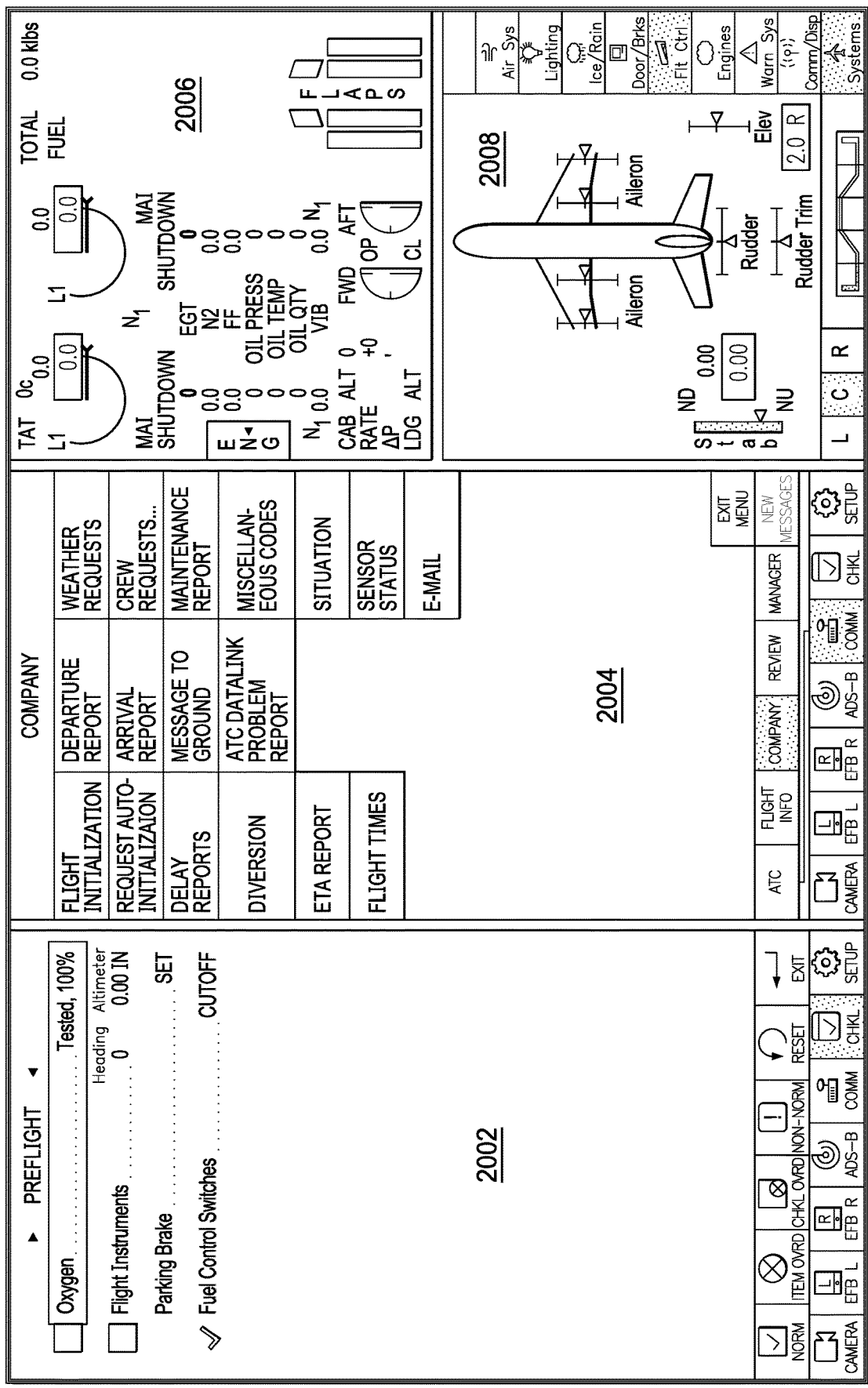
FIG. 20 is an illustration of a window configuration for a display device used by a pilot in accordance with an illustrative embodiment.

With reference next to FIG. 20, an illustration of a window configuration for a display device used by a pilot is depicted in accordance with an illustrative embodiment. In this illustrative example, window configuration 2000 is an example of a window configuration in windows 214 configured for display on a display device in display devices 210 for use by pilot 226 to perform a first set of tasks 238 assigned to pilot 226 in FIG. 2.

In this illustrative example, window configuration 2000 includes checklist window 2002, communications multifunction display 2004, engine-indicating and crew-alerting system display 2006, and system display 2008. Checklist window 2002 can be used by pilot 226 to perform a set of tasks 238 for a preflight checklist. Communications multi-function display 2004 can be used to initiate a data link message to an operations center for the airline.

Figure 21:
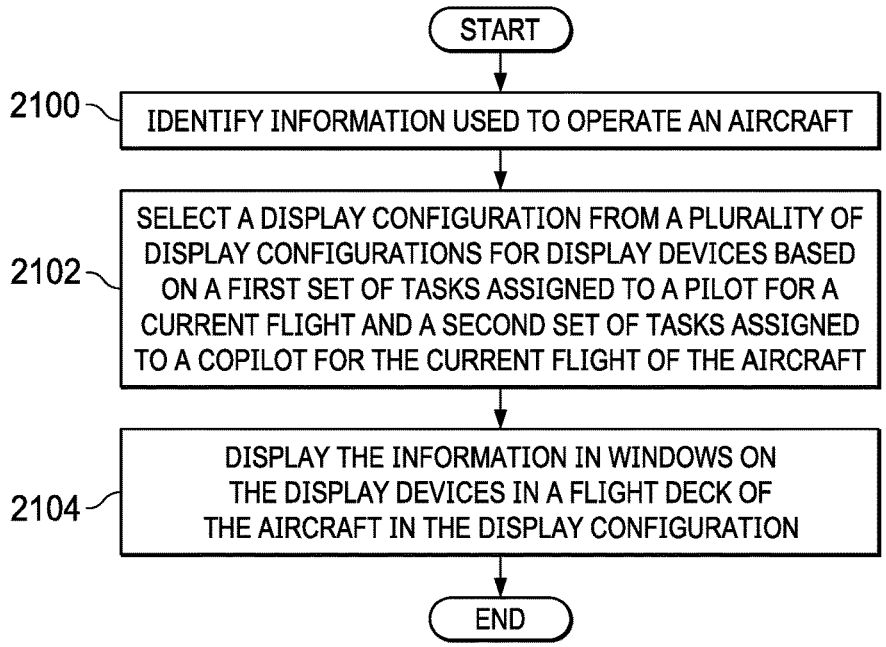
FIG. 21 is an illustration of a flowchart of a process for displaying information in an aircraft in accordance with an illustrative embodiment.

Turning next to FIG. 21, an illustration of a flowchart of a process for displaying information in an aircraft is depicted in accordance with an illustrative embodiment. The process in FIG. 21 can be implemented in hardware, software, or both. When implemented in software, the process can take the form of program code that is run by one or more processor units located in one or more hardware devices in one or more computer systems.

For example, this process can be implemented in information controller 208 in computer system 204 in FIG. 2. In this example, the process in this flowchart can be implemented to display information on display devices 210 in display system 206 in flight deck 224 of aircraft 202 in FIG. 2.

The process begins by identifying information used to operate an aircraft (operation 2100). This information can be obtained from various aircraft systems within the aircraft. The process selects a display configuration from a plurality of display configurations for display devices based on a first set of tasks assigned to a pilot for a current flight and a second set of tasks assigned to a copilot for the current flight of the aircraft (operation 2102).

The process displays the information in windows on the display devices in a flight deck of the aircraft in the display configuration (operation 2104). The process terminates thereafter. The display configuration used to display the information in the windows on the display devices in operation 2102 simplifies access to the information used by the pilot to perform the first set of tasks and the copilot to perform the second set of tasks.

Figure 22:
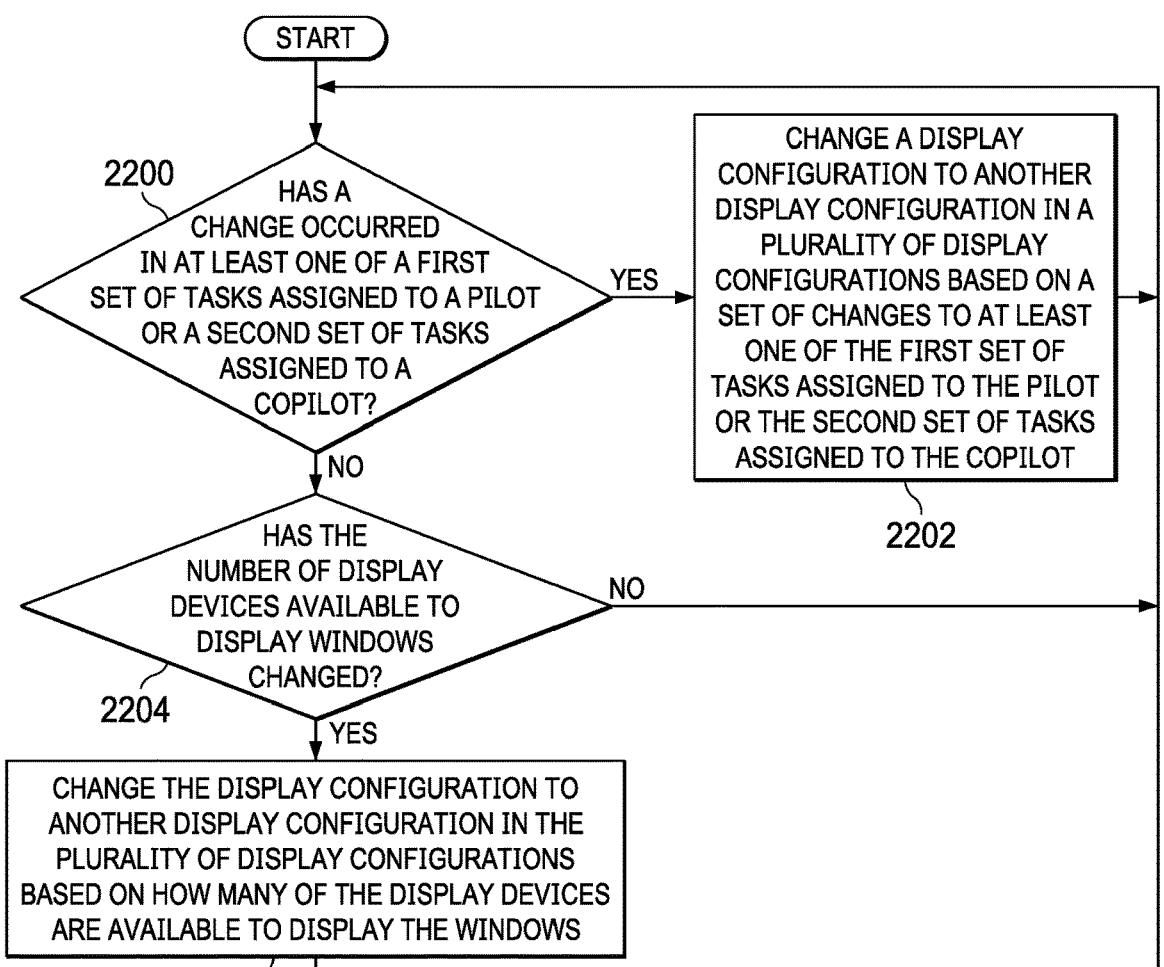
FIG. 22 is an illustration of a flowchart of a process for changing a display configuration in accordance with an illustrative embodiment.

With reference next to FIG. 22, an illustration of a flowchart of a process for changing a display configuration is depicted in accordance with an illustrative embodiment. The process in FIG. 22 can be implemented in hardware, software, or both. When implemented in software, the process can take the form of program code that is run by one or more processor units located in one or more hardware devices in one or more computer systems. For example, this process can be implemented in information controller 208 in computer system 204 in FIG. 2.

The process beings by determining whether a change has occurred in at least one of a first set of tasks assigned to a pilot or a second set of tasks assigned to a copilot (operation 2200). In operation 2200, assigned tasks may change when one or more of the tasks are completed. For example, completion of one task may result in new tasks being present that use different information from the prior tasks. As another example, the pilot and the copilot can swap tasks during a current flight. As another example, the tasks can change if flight conditions change. For example, if an unexpected storm arises, the tasks assigned to at least one of the pilot or the copilot can be changed.

If the assigned tasks have changed, the process changes a display configuration to another display configuration in a plurality of display configurations based on a set of changes to at least one of the first set of tasks assigned to the pilot or the second set of tasks assigned to the copilot (operation 2202). The process then returns to operation 2200.

If the assigned tasks have not changed, a determination is made as to whether a number of display devices available to display windows has changed (operation 2204).

If the number of display devices has changed, the process changes the display configuration to another display configuration in the plurality of display configurations based on how many of the display devices are available to display the windows (operation 2206). The process then returns to operation 2200. If the number of display devices has not changed, the process returns to operation 2200. This process can be repeated any number of times during a flight of an aircraft.

Figure 23:
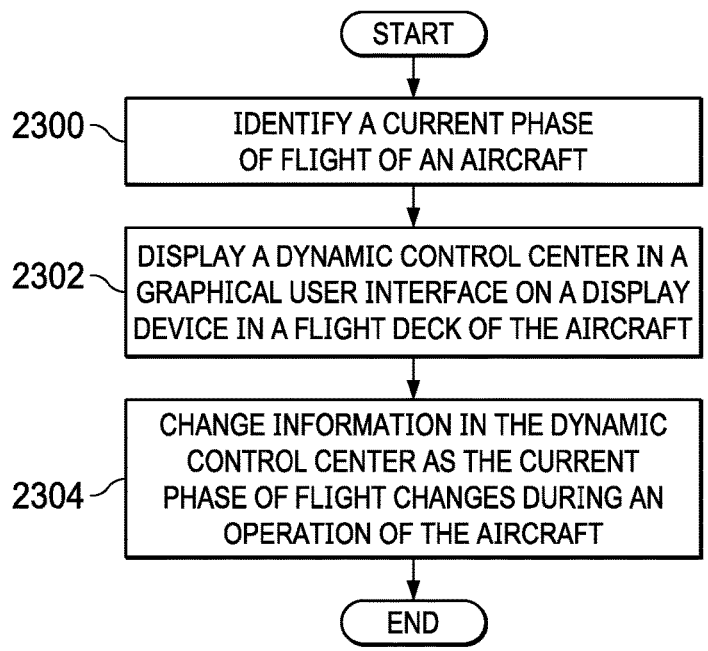
FIG. 23 is an illustration of a flowchart of a process for displaying information for an aircraft on a display device in a flight deck of the aircraft in accordance with an illustrative embodiment.

Turning next to FIG. 23, an illustration of a flowchart of a process for displaying information for an aircraft on a display device in a flight deck of the aircraft is depicted in accordance with an illustrative embodiment. The process illustrated in FIG. 23 can be implemented in at least one of software or hardware. With software, program code is used to implement the different operations in the flowchart. In this example, the operations can be implemented in information controller 208 running on computer system 204 in aircraft 202 in FIG. 2.

The process begins by identifying a current phase of flight of an aircraft (operation 2300). The current phase of flight can be identified from a data processing system in a computer system in the aircraft. The data processing system can be, for example, a flight management system.

The process displays a dynamic control center in a graphical user interface on a display device in a flight deck of the aircraft (operation 2302). Information in the dynamic control center is based on the information used by a flight crew to operate the aircraft during a current phase of flight of the aircraft.

The process changes information in the dynamic control center as the current phase of flight changes during an operation of the aircraft (operation 2304). The process terminates thereafter.

Figure 24:
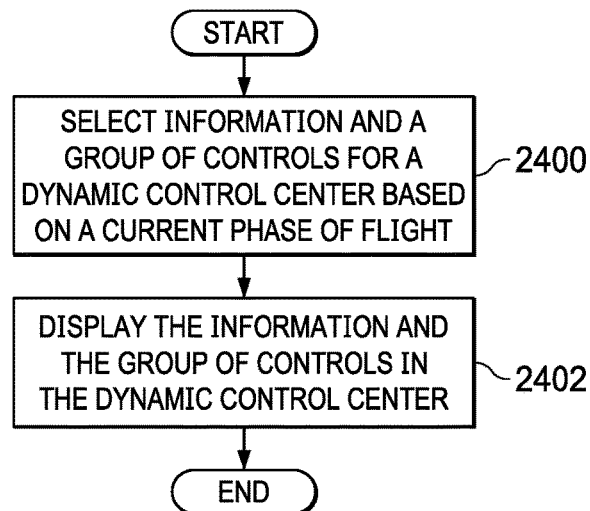
FIG. 24 is an illustration of a flowchart of a process for displaying a dynamic control center in a window in accordance with an illustrative embodiment.

Turning next to FIG. 24, an illustration of a flowchart of a process for displaying a dynamic control center in a window is depicted in accordance with an illustrative embodiment. The process illustrated in FIG. 24 is an example of an implementation of operation 2302 in FIG. 23.

The process begins by selecting information and a group of controls for a dynamic control center based on a current phase of flight (operation 2400). The process displays the information and the group of controls in the dynamic control center (operation 2402). The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 25:
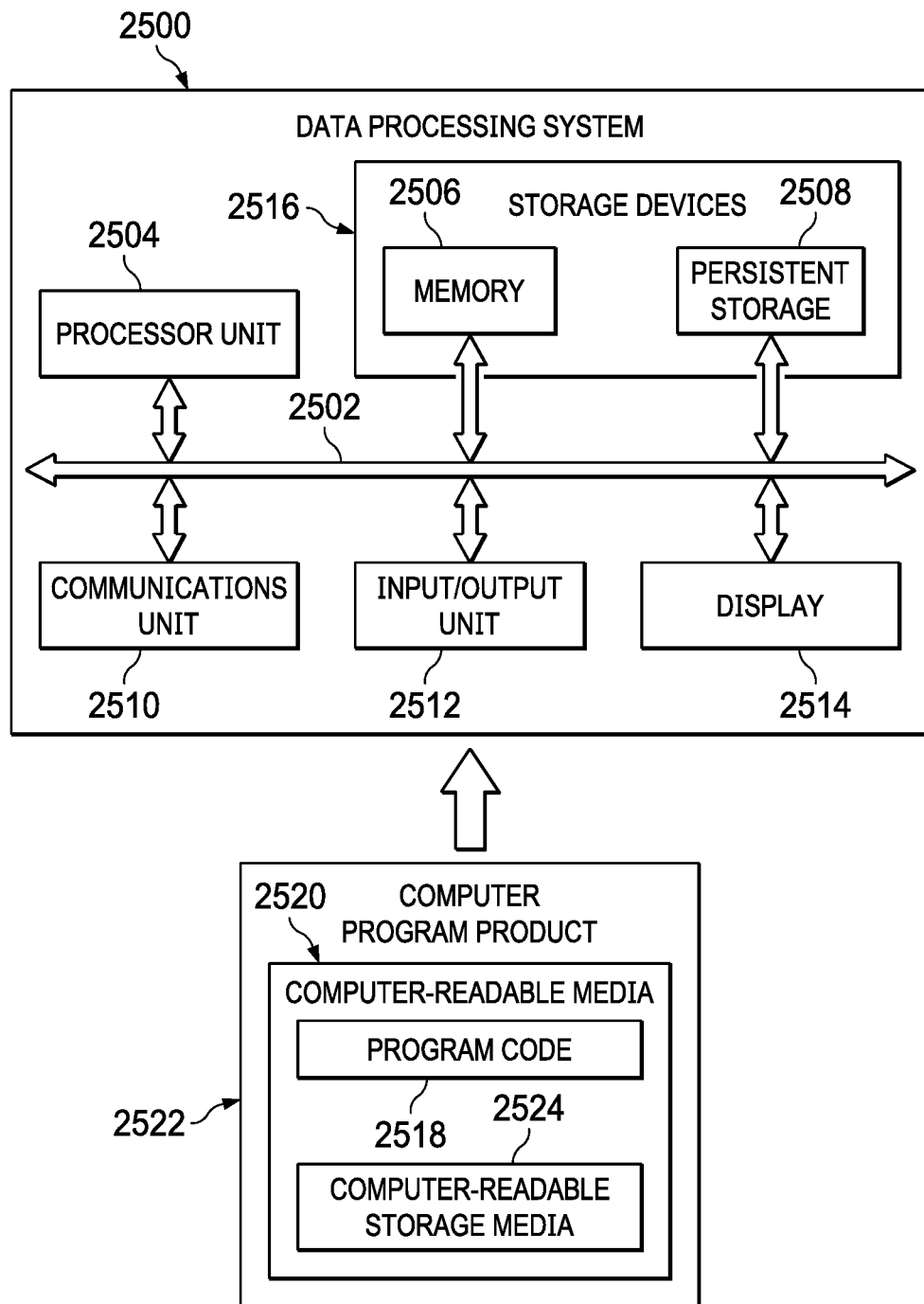
FIG. 25 is a block diagram of a data processing system in accordance with an illustrative embodiment.

Turning now to FIG. 25, a block diagram of a data processing system is depicted in accordance with an illustrative embodiment. Data processing system 2500 can be used to implement computer system 204 in FIG. 2. In this illustrative example, data processing system 2500 includes communications framework 2502, which provides communications between processor unit 2504, memory 2506, persistent storage 2508, communications unit 2510, input/output (I/O) unit 2512, and display 2514. In this example, communications framework 2502 may take the form of a bus system.

Processor unit 2504 serves to execute instructions for software that can be loaded into memory 2506. Processor unit 2504 can be a number of processors, a multi-processor core, or some other type of processor, depending on the particular implementation.

Memory 2506 and persistent storage 2508 are examples of storage devices 2516. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 2516 may also be referred to as computer-readable storage devices in these illustrative examples. Memory 2506, in these examples, can be, for example, a random-access memory or any other suitable volatile or non-volatile storage device. Persistent storage 2508 may take various forms, depending on the particular implementation.

For example, persistent storage 2508 may contain one or more components or devices. For example, persistent storage 2508 can be a hard drive, a solid-state drive (SSD), a flash memory, a rewritable optical disk, a rewritable magnetic tape, or some combination of the above. The media used by persistent storage 2508 also can be removable. For example, a removable hard drive can be used for persistent storage 2508.

Communications unit 2510, in these illustrative examples, provides for communications with other data processing systems or devices. In these illustrative examples, communications unit 2510 is a network interface card.

Input/output unit 2512 allows for input and output of data with other devices that can be connected to data processing system 2500. For example, input/output unit 2512 may provide a connection for user input through at least one of a keyboard, a mouse, or some other suitable input device. Further, input/output unit 2512 may send output to a printer. Display 2514 provides a mechanism to display information to a user.

Instructions for at least one of the operating system, applications, or programs can be located in storage devices 2516, which are in communication with processor unit 2504 through communications framework 2502. The processes of the different embodiments can be performed by processor unit 2504 using computer-implemented instructions, which may be located in a memory, such as memory 2506.

These instructions are referred to as program code, computer usable program code, or computer-readable program code that can be read and executed by a processor in processor unit 2504. The program code in the different embodiments can be embodied on different physical or computer-readable storage media, such as memory 2506 or persistent storage 2508.

Program code 2518 is located in a functional form on computer-readable media 2520 that is selectively removable and can be loaded onto or transferred to data processing system 2500 for execution by processor unit 2504. Program code 2518 and computer-readable media 2520 form computer program product 2522 in these illustrative examples. In the illustrative example, computer-readable media 2520 is computer-readable storage media 2524.

In these illustrative examples, computer-readable storage media 2524 is a physical or tangible storage device used to store program code 2518 rather than a medium that propagates or transmits program code 2518.

Alternatively, program code 2518 can be transferred to data processing system 2500 using a computer-readable signal media. The computer-readable signal media can be, for example, a propagated data signal containing program code 2518. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

The different components illustrated for data processing system 2500 are not meant to provide architectural limitations to the manner in which different embodiments can be implemented. The different illustrative embodiments can be implemented in a data processing system including components in addition to or in place of those illustrated for data processing system 2500. Other components shown in FIG. 25 can be varied from the illustrative examples shown. The different embodiments can be implemented using any hardware device or system capable of running program code 2518.

Figure 26:
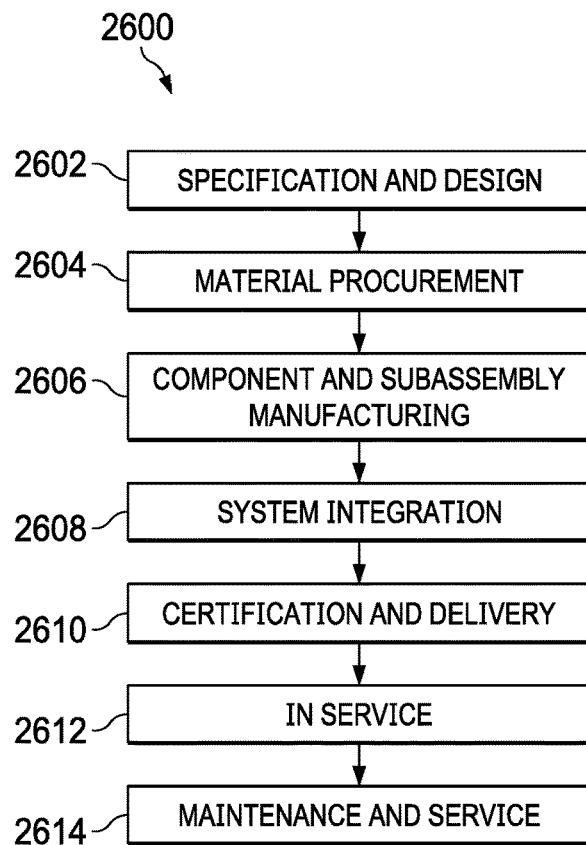
FIG. 26 is an illustration of a block diagram an aircraft manufacturing and service method in accordance with an illustrative embodiment.
Figure 27:
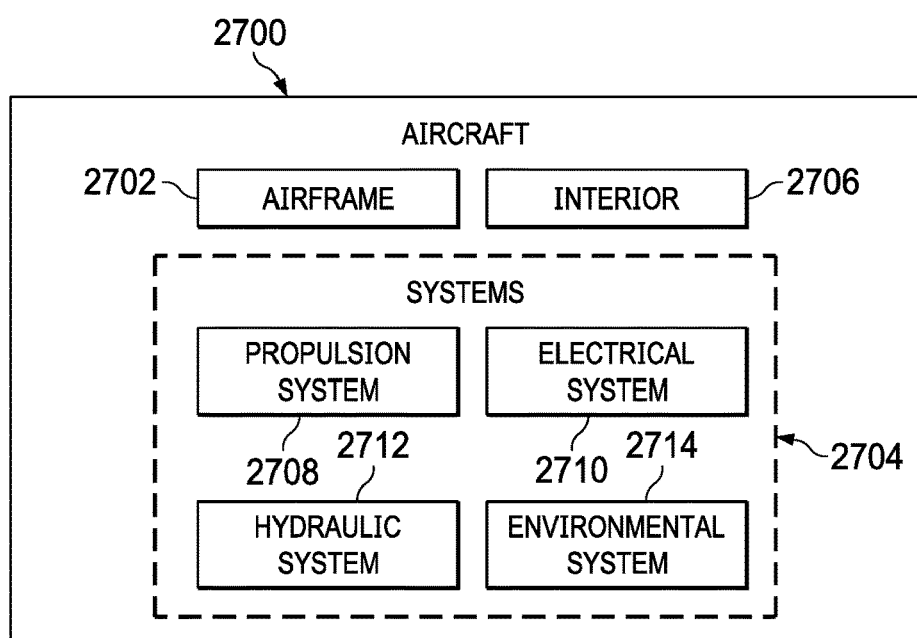
FIG. 27 is an illustration of a block diagram of an aircraft in which an illustrative embodiment may be implemented.

Illustrative embodiments of the disclosure may be described in the context of aircraft manufacturing and service method 2600 as shown in FIG. 26 and aircraft 2700 as shown in FIG. 27. Turning first to FIG. 26, an illustration of a block diagram of an aircraft manufacturing and service method is depicted in accordance with an illustrative embodiment. During pre-production, aircraft manufacturing and service method 2600 may include specification and design 2602 of aircraft 2700 in FIG. 27 and material procurement 2604.

During production, component and subassembly manufacturing 2606 and system integration 2608 of aircraft 2700 in FIG. 27 takes place. Thereafter, aircraft 2700 may go through certification and delivery 2610 in order to be placed in service 2612. While in service 2612 by a customer, aircraft 2700 is scheduled for routine maintenance and service 2614, which may include modification, reconfiguration, refurbishment, and other maintenance or service.

Each of the processes of aircraft manufacturing and service method 2600 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 27, an illustration of a block diagram an aircraft is depicted in which an illustrative embodiment may be implemented. In this example, aircraft 2700 is produced by aircraft manufacturing and service method 2600 in FIG. 26 and may include airframe 2702 with plurality of systems 2704 and interior 2706. Examples of systems 2704 include one or more of propulsion system 2708, electrical system 2710, hydraulic system 2712, and environmental system 2714. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 2600 in FIG. 26.

In one illustrative example, components or subassemblies produced in component and subassembly manufacturing 2606 in FIG. 26 may be fabricated or manufactured in a manner similar to components or subassemblies produced while aircraft 2700 is in service 2612 in FIG. 26. As yet another example, one or more apparatus embodiments, method embodiments, or a combination thereof may be utilized during production stages, such as component and subassembly manufacturing 2606 and system integration 2608 in FIG. 26. One or more apparatus embodiments, method embodiments, or a combination thereof may be utilized while aircraft 2700 is in service 2612, during maintenance and service 2614 in FIG. 26, or both. The use of a number of the different illustrative embodiments may substantially expedite the assembly of aircraft 2700, reduce the cost of aircraft 2700, or both expedite the assembly of aircraft 2700 and reduce the cost of aircraft 2700.

Thus, the illustrative embodiments provide a method, apparatus, and system for displaying information for an aircraft on display devices in a flight deck of the aircraft. A computer system in the aircraft identifies information used to operate the aircraft. The computer system selects a display configuration from a plurality of display configurations for the display devices based on a first set of tasks assigned to a pilot for a current flight and a second set of tasks assigned to a copilot for the current flight of the aircraft. The computer system displays the information in windows on display devices in the flight deck of the aircraft in the display configuration. The display configuration increases access to the information used by the pilot to perform the first set of tasks and the copilot to perform the second set of tasks.

As described above, different display configurations can be used to display the information used to operate the aircraft. The use of an information controller to select display configurations based on a first set of tasks assigned to a pilot for a current flight and a second set of tasks assigned to a copilot for the current flight of the aircraft reduces cognitive workload and can decrease a need for additional or increased training. Additionally, in the illustrative examples, the display system reduces the size of the aisle stand in the flight deck. Thus, with reducing the amount of space needed to provide controls to a flight crew to operate an aircraft, comfort of pilots and other flight crew in the flight deck of an aircraft also can be increased.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An aircraft control system that comprises:
 a computer system in an aircraft;
  display devices located in a flight deck of the aircraft; and
  an information controller in the computer system, wherein the information controller is configured to:
   display information in windows on the display devices in a first display configuration, wherein the first display configuration comprises a first arrangement of the windows on the display devices and is selected from a plurality of display configurations for the display devices wherein each of the plurality of display configurations comprises a different arrangement of the windows on the display devices;
   identify a change in the aircraft that comprises a change in how many of the display devices are available to display the windows; and
   in response to identifying the change in the aircraft, display the information in the windows on the display devices in a second display configuration, wherein the second display configuration comprises a second arrangement of the windows on the display devices that is selected from the plurality of display configurations.

2. The aircraft control system of claim 1, wherein the information controller is configured to:
 display the information in the windows on the display devices in the first display configuration during a current flight of the aircraft;
 identify the change in the aircraft during the current flight of the aircraft; and
 in response to identifying the change in the aircraft, display the information in the windows on the display devices in the second display configuration during the current flight of the aircraft.

3. The aircraft control system of claim 1, wherein the change in the aircraft further comprises a change in a first set of tasks assigned to a pilot of the aircraft or a change in a second set of tasks assigned to a copilot of the aircraft.

4. The aircraft control system of claim 1, wherein the change in the aircraft further comprises a change in a current phase of flight of the aircraft.

5. The aircraft control system of claim 1, wherein the display devices are touchscreen display devices and wherein the information controller is configured to display the information for an aircraft system and controls for controlling the aircraft system in the windows on a touchscreen display device in the touchscreen display devices.

6. The aircraft control system of claim 1, wherein the information controller is configured to receive user input to change a location of a window in the windows displayed on a shared display device in the display devices and to display the window in the location.

7. The aircraft control system of claim 1, wherein the plurality of display configurations is stored in a data structure selected from a table, a database, a file, and a linked list.

8. The aircraft control system of claim 1, wherein the information is received from at least one of a flight management system, an engine, an aircraft flight control system, a fuel system, hydraulics, a navigation system, a radio, a weather system, a crew-alerting system, a video surveillance system, a communications system, a maintenance system, or an electronic flight bag system.

9. A method for displaying information for an aircraft on display devices in a flight deck of the aircraft, the method comprising:
- identifying, by a computer system in the aircraft, information used to operate the aircraft;
- selecting, by the computer system, a first display configuration from a plurality of display configurations for the display devices, wherein the first display configuration comprises a first arrangement of windows for displaying the information on the display devices and wherein each of the plurality of display configurations comprises a different arrangement of the windows for displaying the information on the display devices;
- displaying, by the computer system, the information in the windows on the display devices in the flight deck of the aircraft in the first display configuration;
- identifying, by the computer system, a change in the aircraft comprising identifying a change in how many of the display devices are available to display the windows;
- in response to identifying the change in the aircraft, selecting, by the computer system, a second display configuration from the plurality of display configurations for the display devices, wherein the second display configuration comprises a second arrangement of the windows for displaying the information on the display devices; and
- displaying, by the computer system, the information in the windows on the display devices in the flight deck of the aircraft in the second display configuration.

10. The method of claim 9, wherein:
- displaying the information in the windows on the display devices in the flight deck of the aircraft in the first display configuration comprised displaying the information in the windows on the display devices in the first display configuration during a current flight of the aircraft;
- identifying the change in the aircraft comprises identifying the change in the aircraft during the current flight of the aircraft;
- selecting the second display configuration from the plurality of display configurations comprises selecting the second display configuration from the plurality of display configurations during the current flight of the aircraft; and
- displaying the information in the windows on the display devices in the flight deck of the aircraft in the second display configuration comprises displaying the information in the windows on the display devices in the second display configuration during the current flight of the aircraft.

11. The method of claim 9, wherein identifying the change in the aircraft further comprises identifying a change in a first set of tasks assigned to a pilot of the aircraft or a change in a second set of tasks assigned to a copilot of the aircraft.

12. The method of claim 9, wherein identifying the change in the aircraft further comprises identifying a change in a current phase of flight of the aircraft.

13. The method of claim 9, wherein the display devices are touchscreen display devices, and further comprising:
- displaying, by the computer system, the information for an aircraft system and controls for controlling the aircraft system in a window in the windows on a touchscreen display device in the touchscreen display devices.

14. The method of claim 9 further comprising:
- receiving, by the computer system, a user input to change a location of a window in the windows displayed on a shared display device in the display devices; and
- displaying, by the computer system the window in the location.

15. The method of claim 9, wherein the plurality of display configurations is stored in a data structure selected from a table, a database, a file, and a linked list.

16. The method of claim 9, wherein the information is received from at least one of a flight management system, an engine, an aircraft flight control system, a fuel system, hydraulics, a navigation system, a radio, a weather system, a crew-alerting system, a video surveillance system, a communications system, a maintenance system, or an electronic flight bag system.

17. A method for displaying information for an aircraft on display devices in a flight deck of the aircraft, the method comprising:
- identifying, by a computer system in the aircraft, information used to operate the aircraft;
- selecting, by the computer system, a first display configuration from a plurality of display configurations for the display devices, wherein the first display configuration comprises a first arrangement of windows for displaying the information on the display devices and wherein each of the plurality of display configurations comprises a different arrangement of the windows for displaying the information on the display devices;
- displaying, by the computer system, the information in the windows on the display devices in the flight deck of the aircraft in the first display configuration;
- identifying, by the computer system, a change in the aircraft comprising a change in a first set of tasks assigned to a pilot of the aircraft, a change in a second set of tasks assigned to a copilot of the aircraft, a change in a current phase of flight of the aircraft, or a change in how many of the display devices are available to display the windows;
- in response to identifying the change in the aircraft, selecting, by the computer system, a second display configuration from the plurality of display configurations for the display devices, wherein the second display configuration comprises a second arrangement of the windows for displaying the information on the display devices; and
- displaying, by the computer system, the information in the windows on the display devices in the flight deck of the aircraft in the second display configuration.

18. The method of claim 17, wherein:
- displaying the information in the windows on the display devices in the flight deck of the aircraft in the first display configuration comprised displaying the information in the windows on the display devices in the first display configuration during a current flight of the aircraft;

identifying the change in the aircraft comprises identifying the change in the aircraft during the current flight of the aircraft;

selecting the second display configuration from the plurality of display configurations comprises selecting the second display configuration from the plurality of display configurations during the current flight of the aircraft; and displaying the information in the windows on the display devices in the flight deck of the aircraft in the second display configuration comprises displaying the information in the windows on the display devices in the second display configuration during the current flight of the aircraft.

* * * * *